(12) United States Patent
Hubbard et al.

(10) Patent No.: US 11,324,974 B2
(45) Date of Patent: May 10, 2022

(54) FACE MASK

(71) Applicant: The University of North Carolina at Chapel Hill, Chapel Hill, NC (US)

(72) Inventors: Devin Kerry Hubbard, Chapel Hill, NC (US); Nicole Lewis Wiley, Pittsboro, NC (US); Ethan John Smith, Garner, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 17/232,596

(22) Filed: Apr. 16, 2021

(65) Prior Publication Data

US 2021/0322796 A1 Oct. 21, 2021

Related U.S. Application Data

(60) Provisional application No. 63/011,549, filed on Apr. 17, 2020.

(51) Int. Cl.
*A62B 7/10* (2006.01)
*A41D 13/11* (2006.01)
(Continued)

(52) U.S. Cl.
CPC .......... *A62B 7/10* (2013.01); *A41D 13/1161* (2013.01); *A62B 18/02* (2013.01); *A62B 18/082* (2013.01); *A62B 18/084* (2013.01); *A62B 23/025* (2013.01); *B01D 39/083* (2013.01); *B01D 39/16* (2013.01); *B01D 46/0005* (2013.01); *B01D 2239/0622* (2013.01); *B01D 2239/0627* (2013.01); *B01D 2279/65* (2013.01)

(58) Field of Classification Search
CPC ............... A41D 13/11; A41D 13/1138; A41D 13/1161; A62B 7/10; A62B 18/02; A62B 18/082; A62B 18/084; A62B 23/025; B01D 39/16; B01D 2239/0622; B01D 2239/0627; B01D 2279/65; B01D 46/0005
See application file for complete search history.

(56) References Cited

U.S. PATENT DOCUMENTS 5,237,986 A * 8/1993 Seppala ............. A41D 13/1146
128/201.23
5,819,731 A * 10/1998 Dyrud ................. A41D 13/1146
128/206.27

(Continued)

OTHER PUBLICATIONS

International Search Report and the Written Opinion of the International Searching Authority Corresponding to International Application No. PCT/US 2021/027616 dated Aug. 5, 2021.

(Continued)

*Primary Examiner* — Robert Clemente
(74) *Attorney, Agent, or Firm* — Jenkins, Wilson, Taylor & Hunt, P.A.

(57) ABSTRACT

Face mask devices, systems, and methods of use include a frame that holds a suitable filter material, including a face mask, over the user's face to form a seal and prevent unfiltered air from being inhaled through the nose or mouth of the user without first passing through the filter material. The frame is removably attached over the users face by, for example, adjustable straps. The frame may be adjustable in size to be suitable for use on user's having different facial sizes, shapes, and/or geometries.

26 Claims, 32 Drawing Sheets

(51) Int. Cl.
  *B01D 39/16* (2006.01)
  *B01D 39/08* (2006.01)
  *B01D 46/00* (2006.01)
  *A62B 23/02* (2006.01)
  *A62B 18/02* (2006.01)
  *A62B 18/08* (2006.01)

(56) References Cited

U.S. PATENT DOCUMENTS

| | | | |
|---|---|---|---|
| 6,095,143 A | 8/2000 | Dyrud et al. | |
| 8,857,433 B1 | 10/2014 | Kelly | |
| 2004/0173216 A1* | 9/2004 | Park | A62B 23/025 128/206.12 |
| 2006/0266364 A1* | 11/2006 | Turdjian | A41D 31/02 128/206.19 |
| 2007/0252946 A1 | 11/2007 | Welchel et al. | |
| 2009/0078266 A1* | 3/2009 | Stepan | A62B 23/025 128/206.19 |
| 2010/0031962 A1* | 2/2010 | Chiu | A62B 23/025 128/206.19 |
| 2012/0234327 A1 | 9/2012 | Harold et al. | |
| 2014/0216479 A1* | 8/2014 | Jeong | A41D 13/1138 128/863 |
| 2015/0314148 A1* | 11/2015 | Waterford | A62B 18/084 128/863 |

OTHER PUBLICATIONS

Somireddy et al., "Analysis of the Material Behavior of 3D Printed Laminates Via FFF," Experimental Mechanics, 11 pages (2019).

Wiles, "Covid 3D Printed Mask Frame for Halyard, Investigating 99% Filtration," YouTube Video [online] Apr. 4, 2020 [Retrieved on Jul. 2, 2021], Retrieved from the Internet: <url: https://www.youtube.com/watch?v=xVYypLYEo_0>; 0:18-01:00; 01:21; 01:50-02:10, 6 pages.

* cited by examiner

FACE MASK

CROSS-REFERENCE TO RELATED APPLICATION

This application claims priority to U.S. Provisional Patent Application Ser. No. 63/011,549, filed Apr. 17, 2020, the disclosure of which is incorporated herein by reference in its entirety.

GOVERNMENT LICENSE RIGHTS

This invention was made with government support under Grant No. TR002489 awarded by the National Institutes of Health. The government has certain rights in the invention.

BACKGROUND

Personal protective equipment (PPE) is vital in the prevention of the transmission of communicable diseases. As has been shown during the COVID-19 pandemic, it is often impractical for governmental entities to adequately stock sufficient quantities of PPE for use by the general public. Furthermore, existing supply chains are designed to be lean and are not designed to have significant excess manufacturing capacity to rapidly increase production upon the realization of an exigent need. As such, lead times for PPE during periods of time of mass utilization can be so large as to prevent PPE from being available to not only the general public, but also to traditional purchasers of PPE, such as hospitals, due to increased competition in the marketplace for limited quantities of PPE. Such supply constraints can lead to adverse effects within the healthcare industry, such as the rationing of PPE and even the reuse of single-use PPE items, which increases the risk of disease transmission to and between healthcare workers. Even if the raw materials may be readily available, the lack of sufficient manufacturing capacity for making PPE, such as N95 face masks, from this raw material is still a significant hurdle in increasing the quantity of PPE produced for sale in the marketplace. As such, a need exists for a face mask device that can be rapidly mass-produced and is both reusable and is capable of being utilized with suitable raw materials in order to provide a person of the face mask device with the ability to produce a suitable face mask using only a frame, a suitable filter material, and one or more straps for securing the face mask device over the mouth and nose of the person using such a face mask device.

SUMMARY

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Provided herein are face masks, face mask devices and/or face mask apparatuses, sometimes referred to as a FastMask facemask or an AerFrame facemask, comprising a frame that is worn on a user's face over a material or cloth, including for example a high performance filtration material, which creates a tight fit around the user's nose and mouth, preventing unfiltered air from entering the mask. The face mask is secured to the user's face via straps that can pass around the back of the user's head and connect on either side of the face mask frame. Because the face mask devices herein can be used to secure an existing, commercially available, face mask over a user's face to provide an enhanced seal over and about the user's nose and mouth, the face mask devices disclosed herein can sometimes be referred to as a "mask fitter."

In some embodiments, provided is a face mask apparatus comprising a frame configured to be worn on a user's face, wherein the frame is configured to secure a material or cloth against the user's face to prevent unfiltered air from entering the mask apparatus. In some embodiments, the face mask apparatus, when combined with a material or cloth and applied to a user's face, creates a substantially tight fit around the user's nose and mouth thereby preventing unfiltered air from entering the mask apparatus. In some embodiments, the face mask apparatus is configured to be used with any material or cloth sufficient to filter air breathed by the user, optionally a high performance filtration material.

In some embodiments, the disclosed face mask apparatus further comprises one or more tabs or securing mechanisms on the frame and configured to hold a strap or elastic material, wherein the strap or elastic material can be configured to pass around the back of a user's head and connect to either side of the face mask apparatus to secure the face mask apparatus to a user's face when coupled to the one or more tabs or securing mechanisms. In some embodiments, an outer profile of the frame of the face mask apparatus is substantially circular, oval shaped and/or oblong, optionally wherein the frame comprises indentions and contours configured to mimic a shape of a user's face. In some embodiments, the frame of the face mask apparatus is made of a rigid, semi-rigid, flexible and/or elastic material. In some embodiments, the frame of the face mask apparatus further comprises a clip configured to accept, hold, secure and/or position a clear eye/face shield/splash guard over a user's face, optionally wherein the clear eye/face shield/splash guard can be used alone and/or in conjunction with a protective filter material. In some embodiments, the frame of the face mask apparatus is configured to be compatible with and/or to fit/secure any existing face mask, including for example, but not limited to, surgical masks, surgical masks with eye shields already attached, earloop masks, duckbill masks, cloth/bandana/fabric/filtration material, N95, N99, N100, P95, P99, P100, KN95, FFP3,2,1, and/or custom or non-standard masks. In some embodiments, use of the disclosed face mask apparatuses and devices may or may not improve the efficiency and/or efficacy of a face masks, but even where efficiency and/or efficacy is the same, the fit and comfort of the mask when worn by a user can be significantly improved.

DETAILED DESCRIPTION

Figure 1:
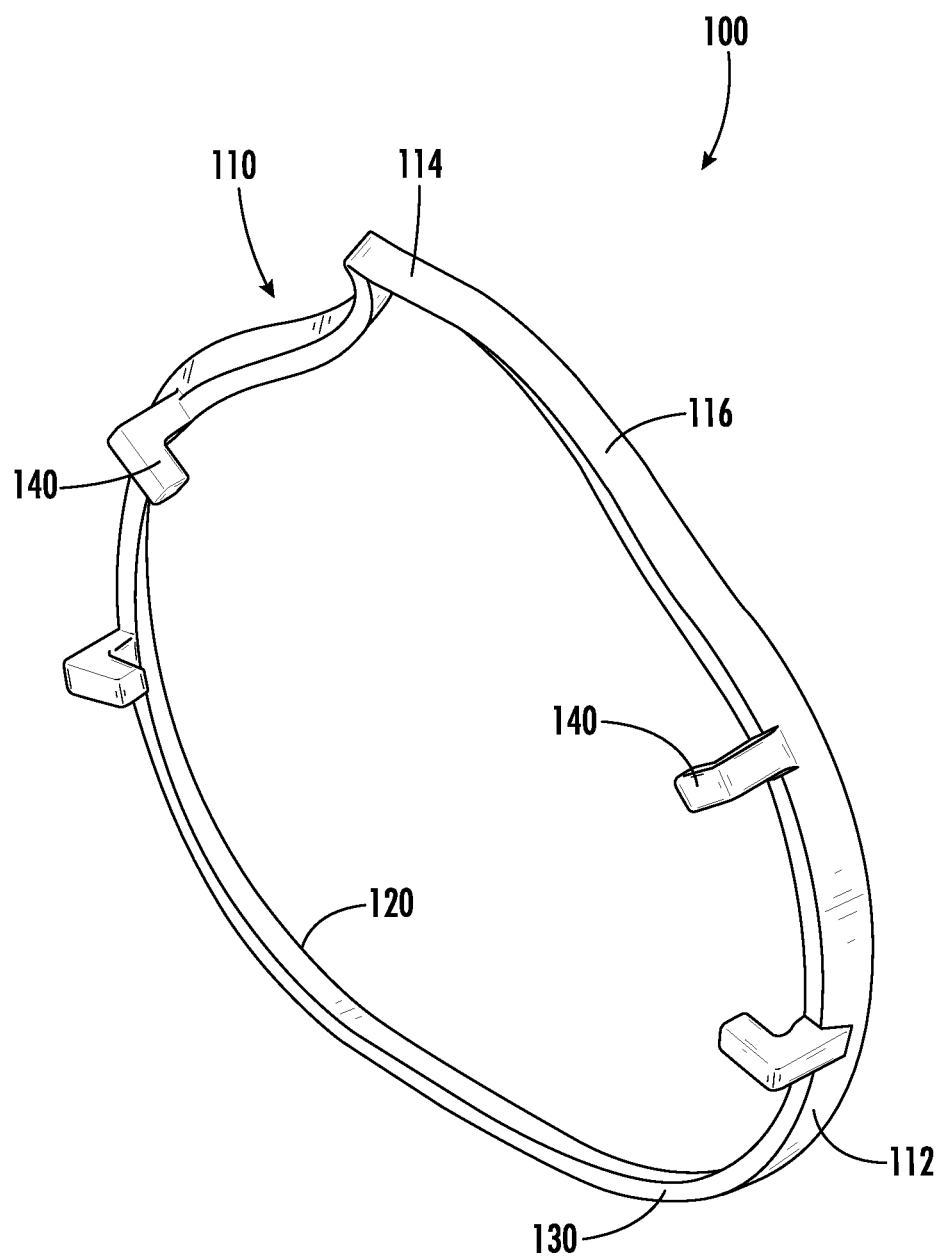
FIG. 1 is an isometric view of a first example embodiment of a face mask device.
Figure 2:
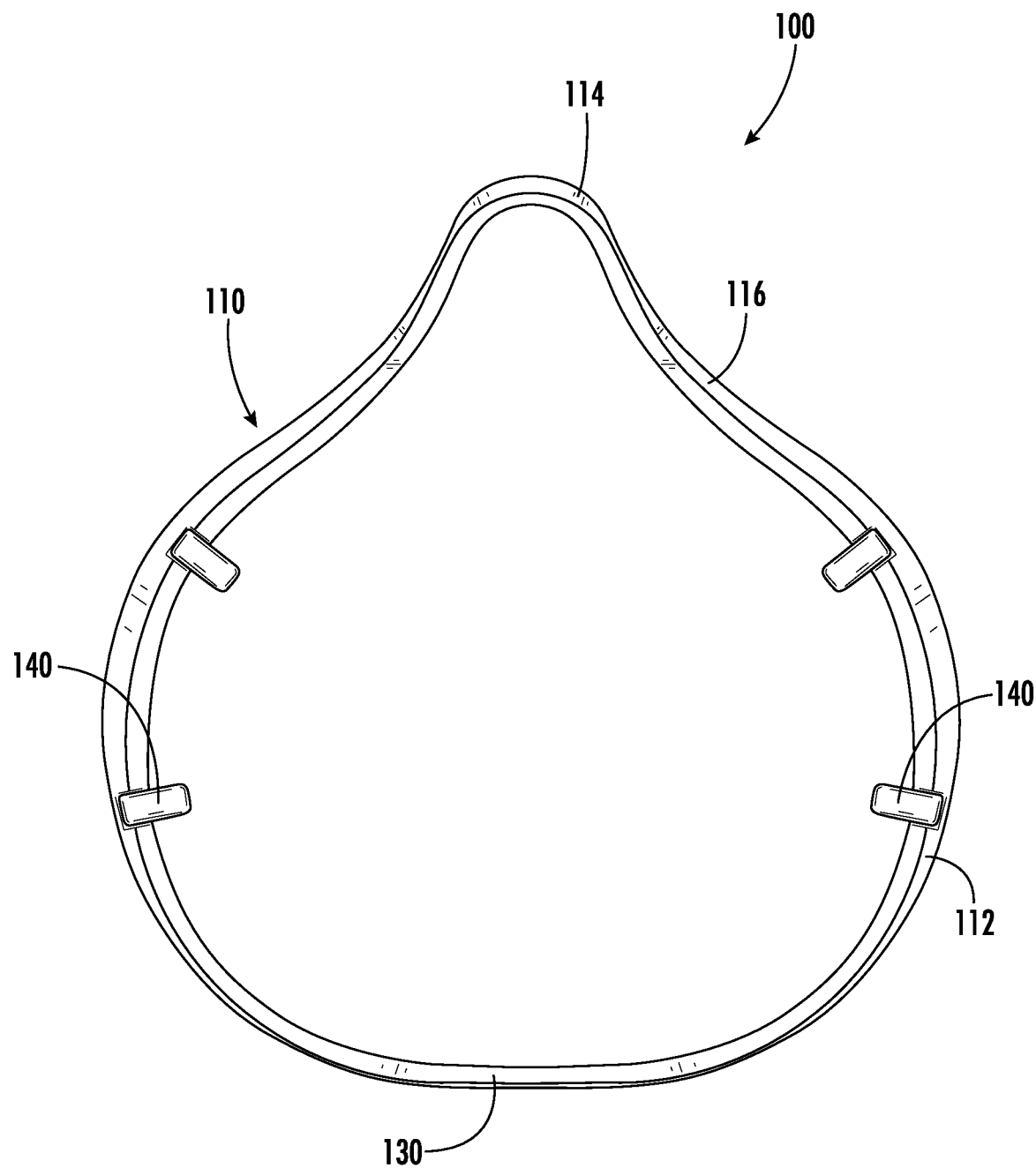
FIG. 2 is a front view of the first example embodiment of the face mask device.
Figure 3:
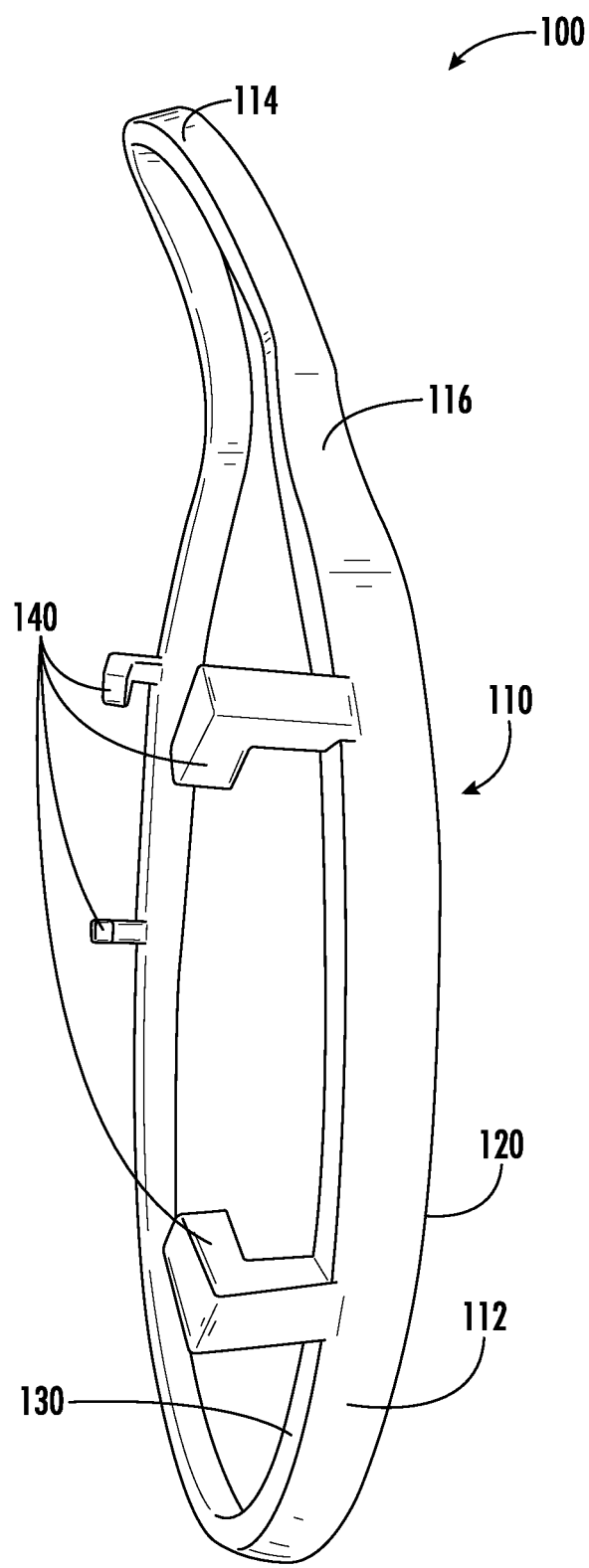
FIG. 3 is a side view of the first example embodiment of the face mask device.
Figure 4:
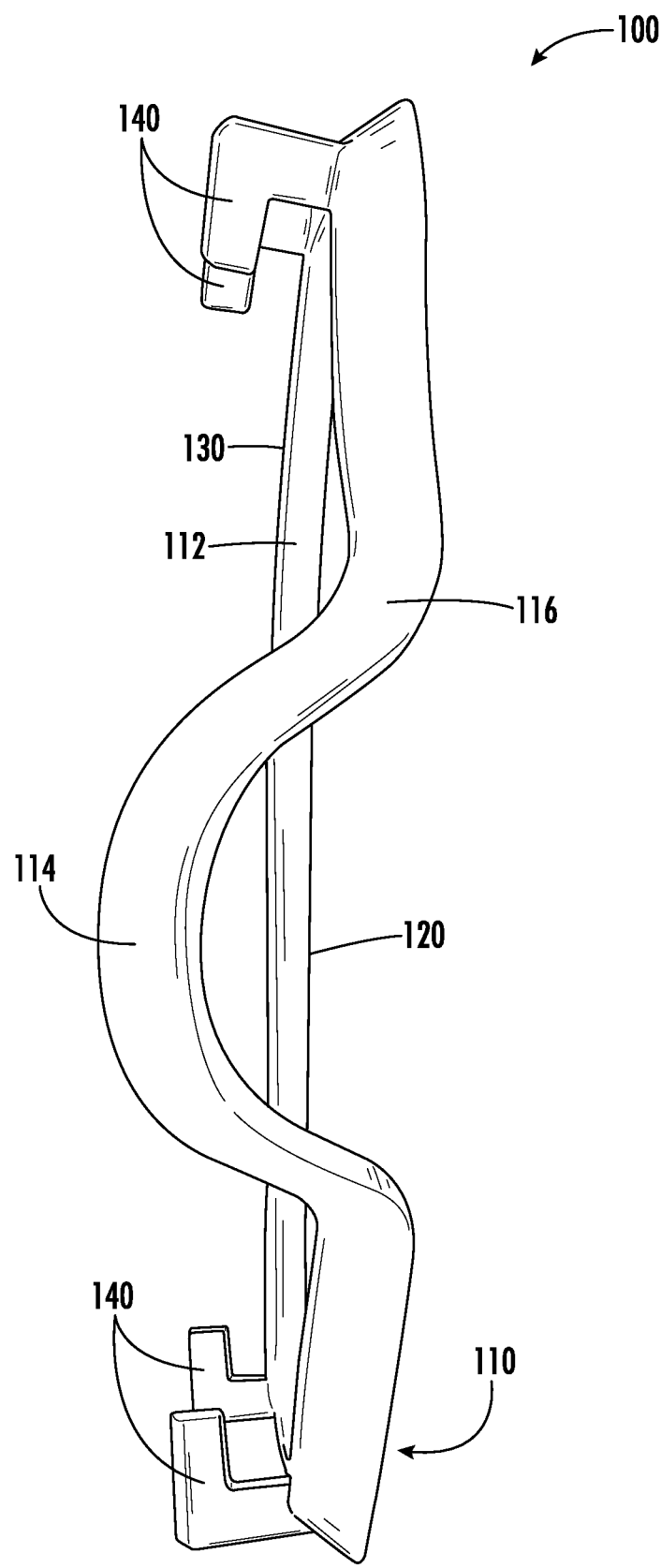
FIG. 4 is a top view of the first example embodiment of the face mask device.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Provided herein are face masks, face mask devices and/or face mask apparatuses, sometimes referred to as a FastMask facemask or an AerFrame facemask, comprising a frame that is worn on a user's face over a material or cloth, including for example a high performance filtration material, which creates a tight fit around the user's nose and mouth, preventing unfiltered air from entering the mask. The face mask is secured to the user's face via straps that can pass around the back of the user's head and connect on either side of the face mask frame. Because the face mask devices herein can be used to secure an existing, commercially available, face mask over a user's face to provide an enhanced seal over and about the user's nose and mouth, the face mask devices disclosed herein can sometimes be referred to as a "mask fitter."

FIGS. 1-7 show various aspects of a first example embodiment of a face mask device, generally designated 100. While several example embodiments are disclosed herein, it should be noted that various features that are shown exclusively in a single example embodiment can be combined in, or omitted from, any other features shown in any other example embodiment. Thus, each feature disclosed in any example embodiment may be combined, without limitation, with any other feature(s) of any other example embodiment, even if a particular combination of features is not expressly illustrated or described herein. As shown, the face mask device 100 includes a frame, generally designated 110, which is configured to be worn on a user's face, and preferably securely over the user's mouth and nose. As used herein, the term "securely" means that the frame, either alone or including any intervening layers of material, is held against the user's face without any gaps being present between the user's face and the frame 110. Stated differently, the frame 110 is held "securely" against the contours of the user's face without any gaps therebetween, such that the frame 110 is sufficiently flexible, pliable, and/or bendable to have the same shape as the contours of the user's face, when the frame 110 is pressed against the user's face.

The frame 110 is configured to secure a filter material, or cloth, against the user's face to prevent any infiltration of unfiltered air (e.g., ambient air that has not passed through, or has bypassed, the filter material) through the perimeter formed by the frame 110 of the face mask device 100. In some embodiments, the face mask device 100, when combined with a filter material, or cloth, and applied over a portion of a user's face, creates a substantially tight fit around the user's nose and mouth, thereby preventing such unfiltered air from entering the cavity defined by the frame 110 and the filter material. The face mask device 100 is configured to be used with any suitable filter material or cloth that provides a sufficient or desired filtration level for air that passes therethrough and is ultimately inhaled by the user wearing the face mask device 100. In some embodiments, the filter material is a high performance filtration material. Examples of such a high performance filtration material can include a melt-blown or spun bonded polypropylene (or similar) material, such as those used in surgical masks meeting the N95 filtration standard. Such high performance filtration material can include any material that is capable of meeting the performance standards set for in, for example, ASTM F3502, ASTM F2100, ASTM F2101, ASTM F1862, ASTM F2299, EN 14683, 16 CFR Part 1610, 29 CFR Part 1910.1030, 42 CFR Part 84, and the like.

The face mask device 100 includes a plurality of tabs 140 rigidly attached on the frame. The tabs 140 are configured to engage with (e.g., secure, hold, and the like) a suitable strap (e.g., 170, FIGS. 5-7, which are made from an elastic material) for securing the face mask device 100 onto the user's face. In some embodiments, the tabs 140 are arranged on the frame 110 as opposing pairs, such that a strap 170 extending between one or more pairs of tabs 140 can be positioned around the back of the user's head and secure the face mask device 100 to the user's face when such a strap 170 is coupled between opposing tabs 140 of the face mask device 100. While the term "tab" is used herein, any suitable attachment mechanism can be used without limitation. In the embodiment shown in FIGS. 1-7, the tabs 140 have a generally L-shaped profile extending from the face mask device 100. The tabs 140 may extend from any suitable surface of the frame 110, including the front or lateral sides thereof. The frame 110 has a front surface 130 and a rear surface 120. In the example embodiment shown in FIGS. 1-7, the tabs 140 generally extend away from the front surface 130 are formed in a single piece with the frame 110. The face mask device 100 can be designed to have any suitable number of tabs 140, including only a single tab 140, as long as a compressive force of a sufficient magnitude is capable of being generated between the rear surface 120 of the frame 110 and the contact surface of the user's face around an entire perimeter of the frame 110.

In the first example embodiment, the frame 110 of the face mask device 100 is formed from at least two pieces having differently-shaped profiles, namely, a lower portion 112 and an upper portion 114. The lower portion 112 and the upper portion 114 can be formed integrally, assembled together, formed as a monolithic structure (e.g., as a single piece), and the like. The lower portion 112 has a profile that is substantially circular, but may be customized to fit the shape of a user's face. As such, the lower portion 112 can be generally oval-shaped and/or oblong. In some embodiments, the frame 110 comprises indentions and contours that to mimic (e.g., are a same, or substantially similar, shape as) a shape of a user's face. The lower portion 112 is connected to the upper portion 114 at the transition point 116, which is the inflection point along the frame 110 at which the profile of the frame 110 transitions from the shape of the lower portion 112 to the upper portion 114. The upper portion 114 is the portion of the frame 110 that is secured over (e.g., on, above, and/or around) the user's nose. The upper portion 114 may be formed such that it is not coplanar with the lower portion 112, as shown in at least FIGS. 3 and 4. It is advantageous for the upper portion 114 to have a generally triangular-shaped profile, such that the upper portion 114 can be secured over the bridge of the user's nose.

The frame 110 of the face mask device 100 can be made from a rigid material, a semi-rigid material, a flexible material, an elastic material, and/or combinations of any such materials.

Figure 5:
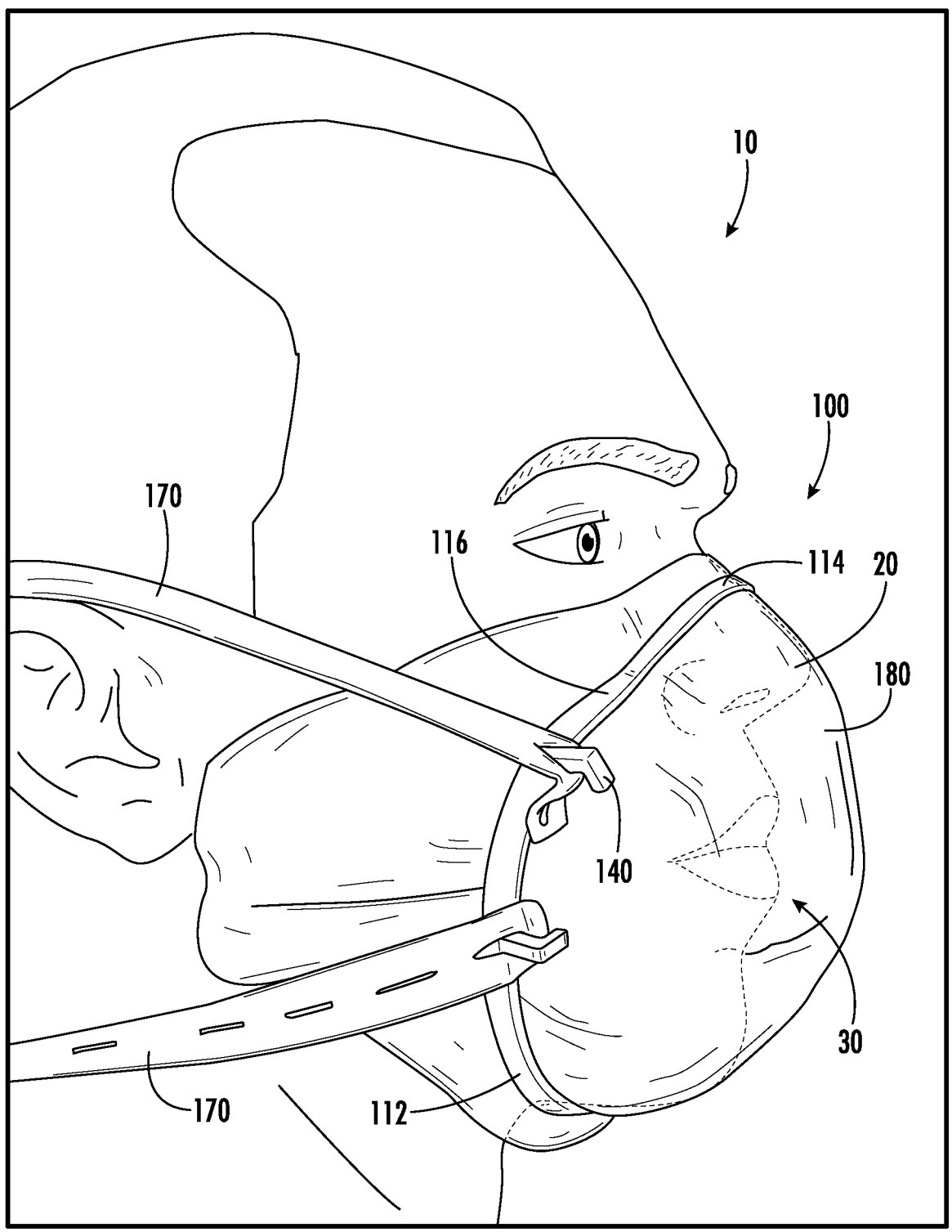
FIG. 5 is a side view of the view of the first example embodiment of the face mask device being worn over the mouth and nose of a person.
Figure 6:
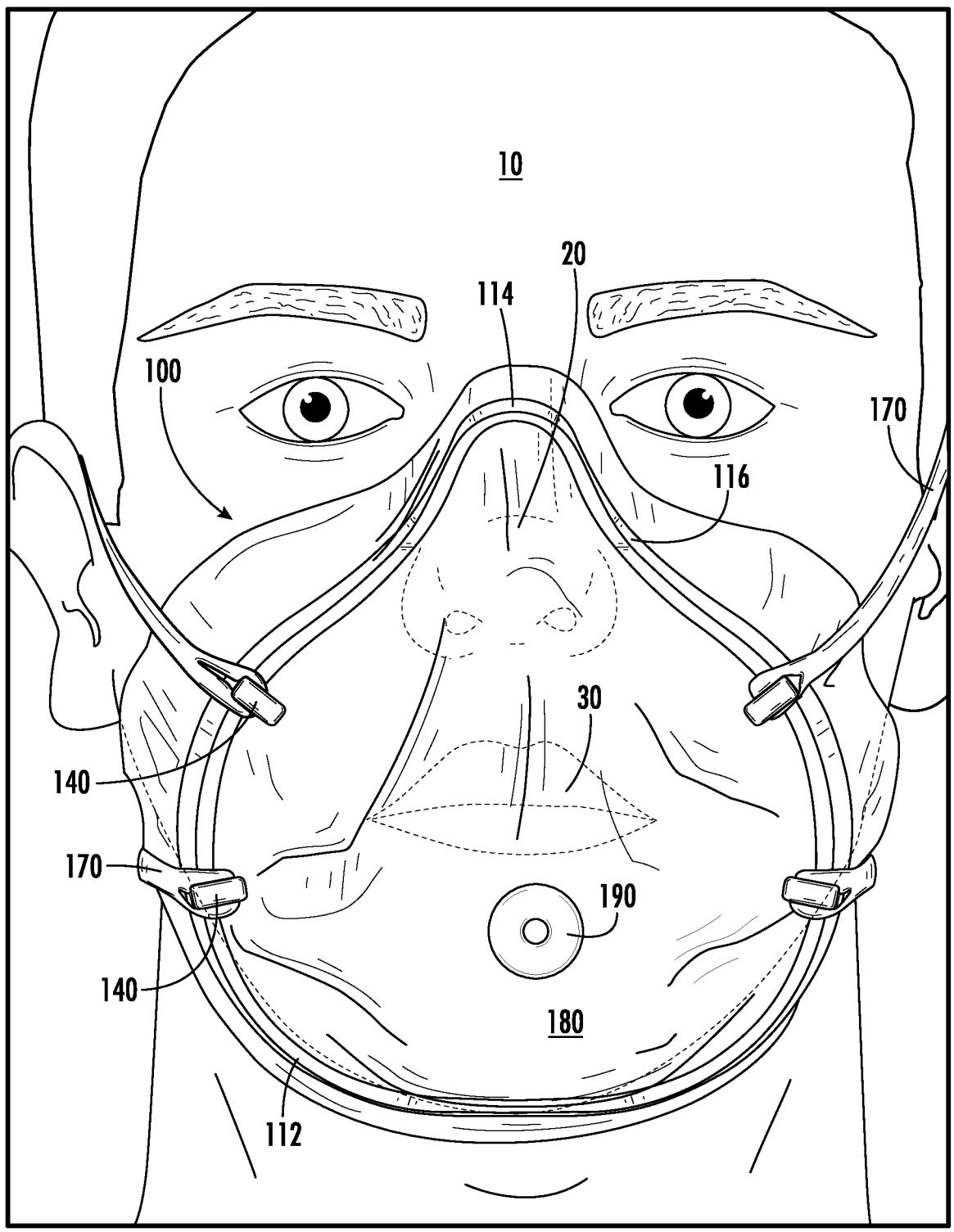
FIG. 6 is a front view of the first example embodiment of the face mask device being worn over the mouth and nose of a person.
Figure 7:
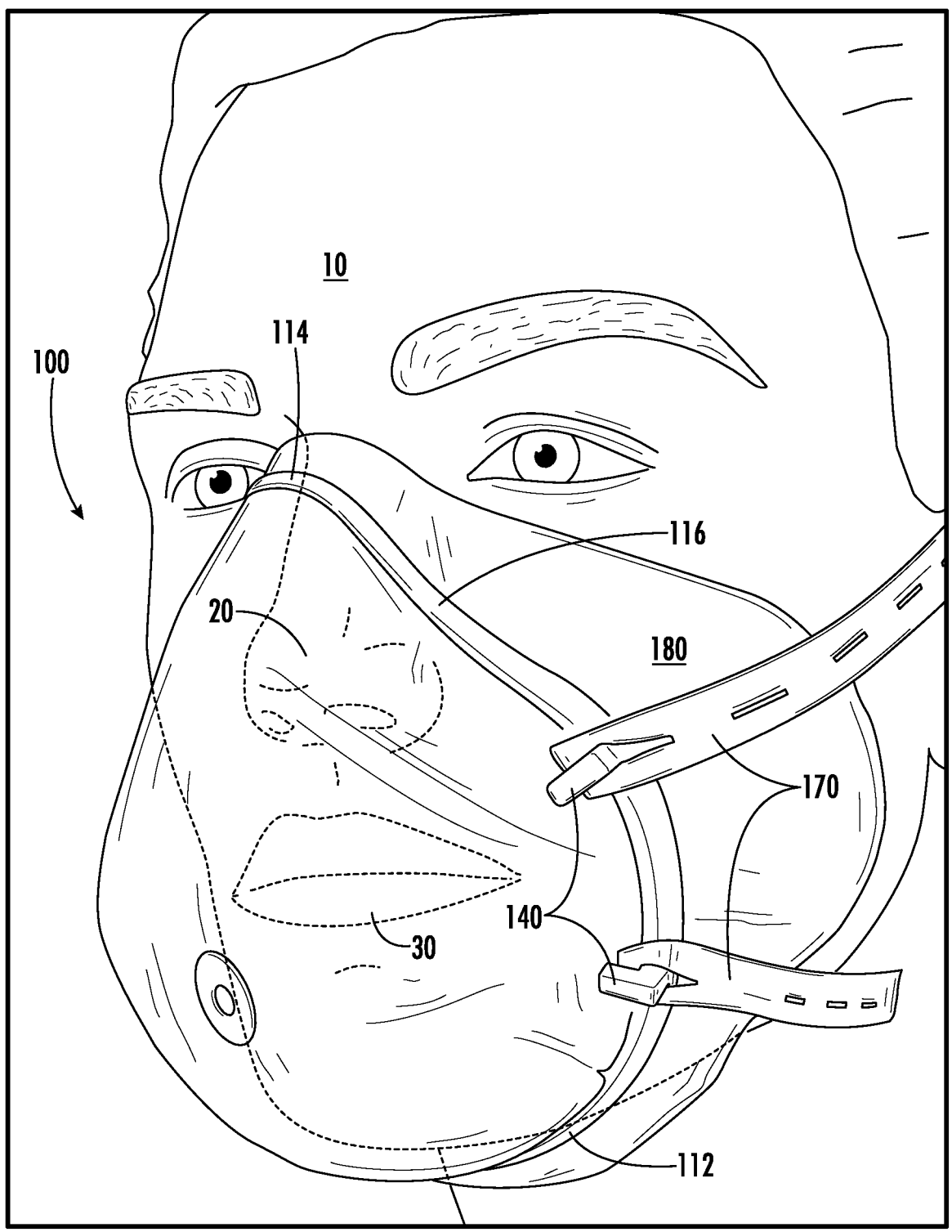
FIG. 7 is an isometric view of the first example embodiment of the face mask device being worn over the mouth and nose of a person.
Figure 8:
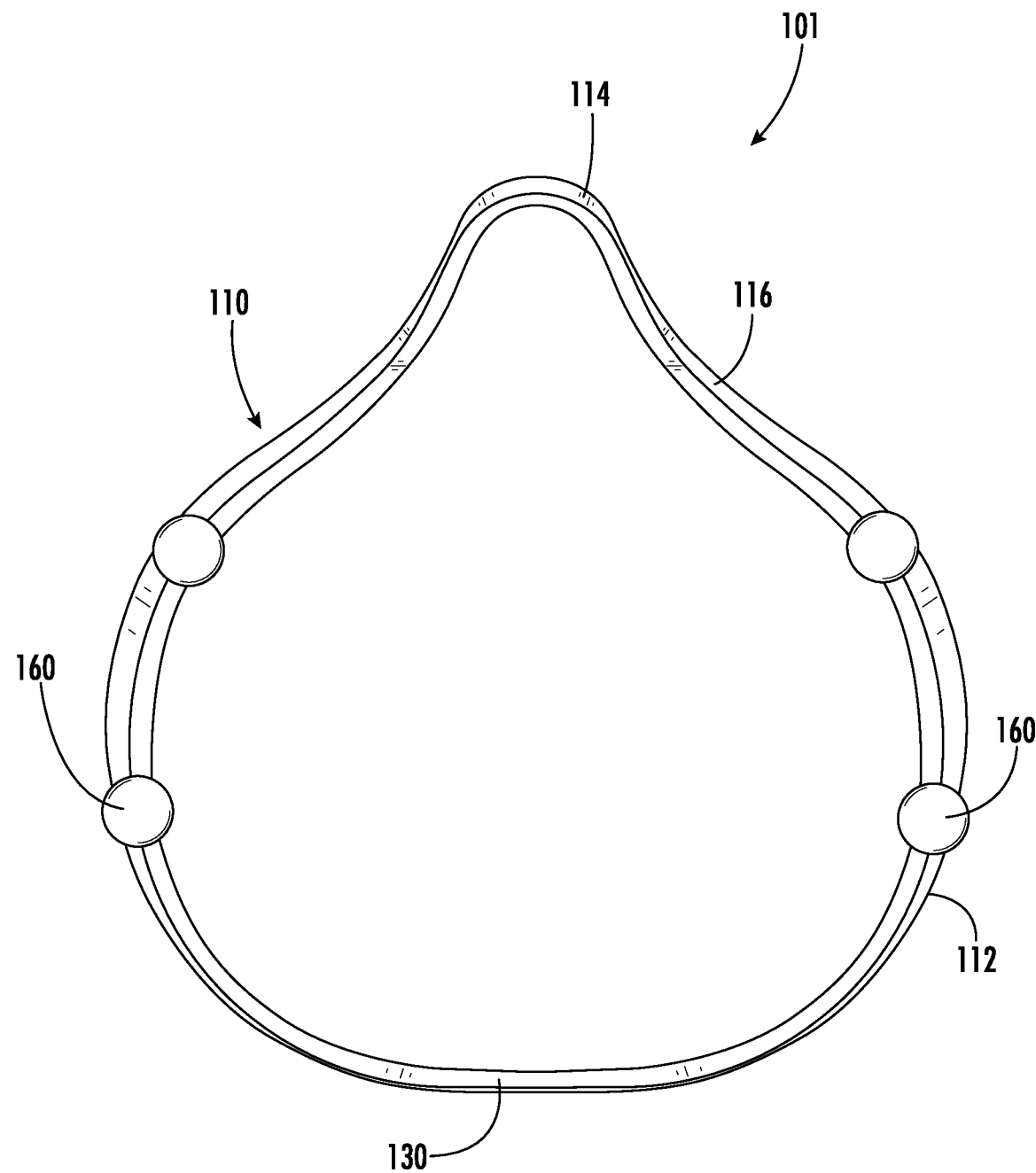
FIG. 8 is a front view of a second example embodiment of a face mask device.
Figure 9:
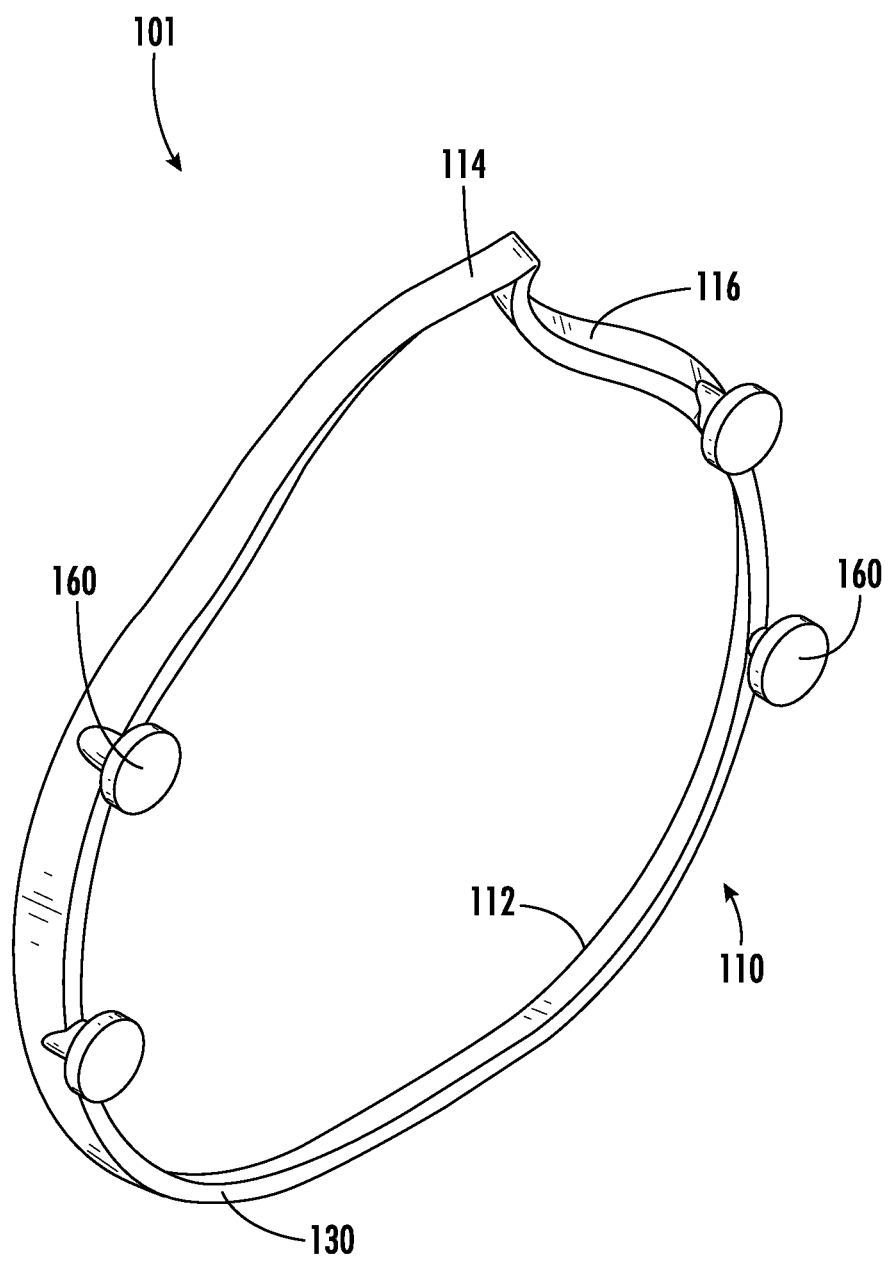
FIG. 9 is an isometric view of the second example embodiment of the face mask device.
Figure 10:
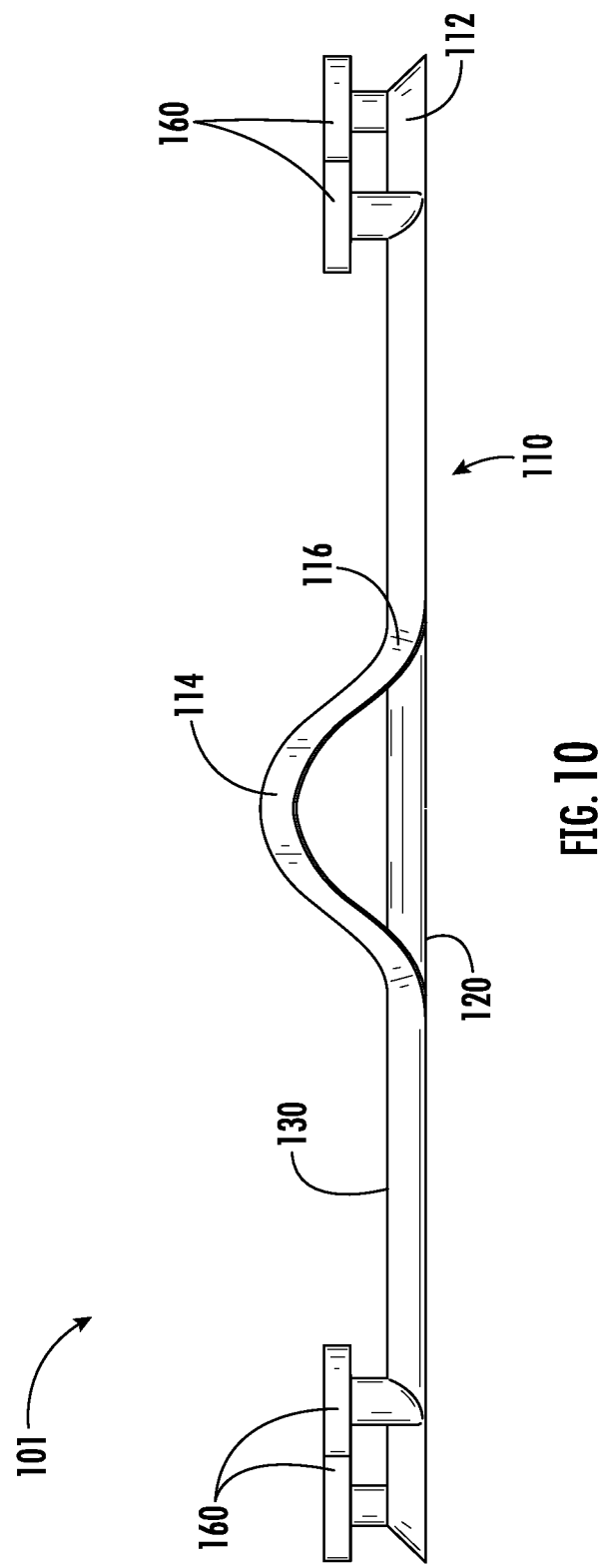
FIG. 10 is a top view of the second example embodiment of the face mask device.
Figure 11:
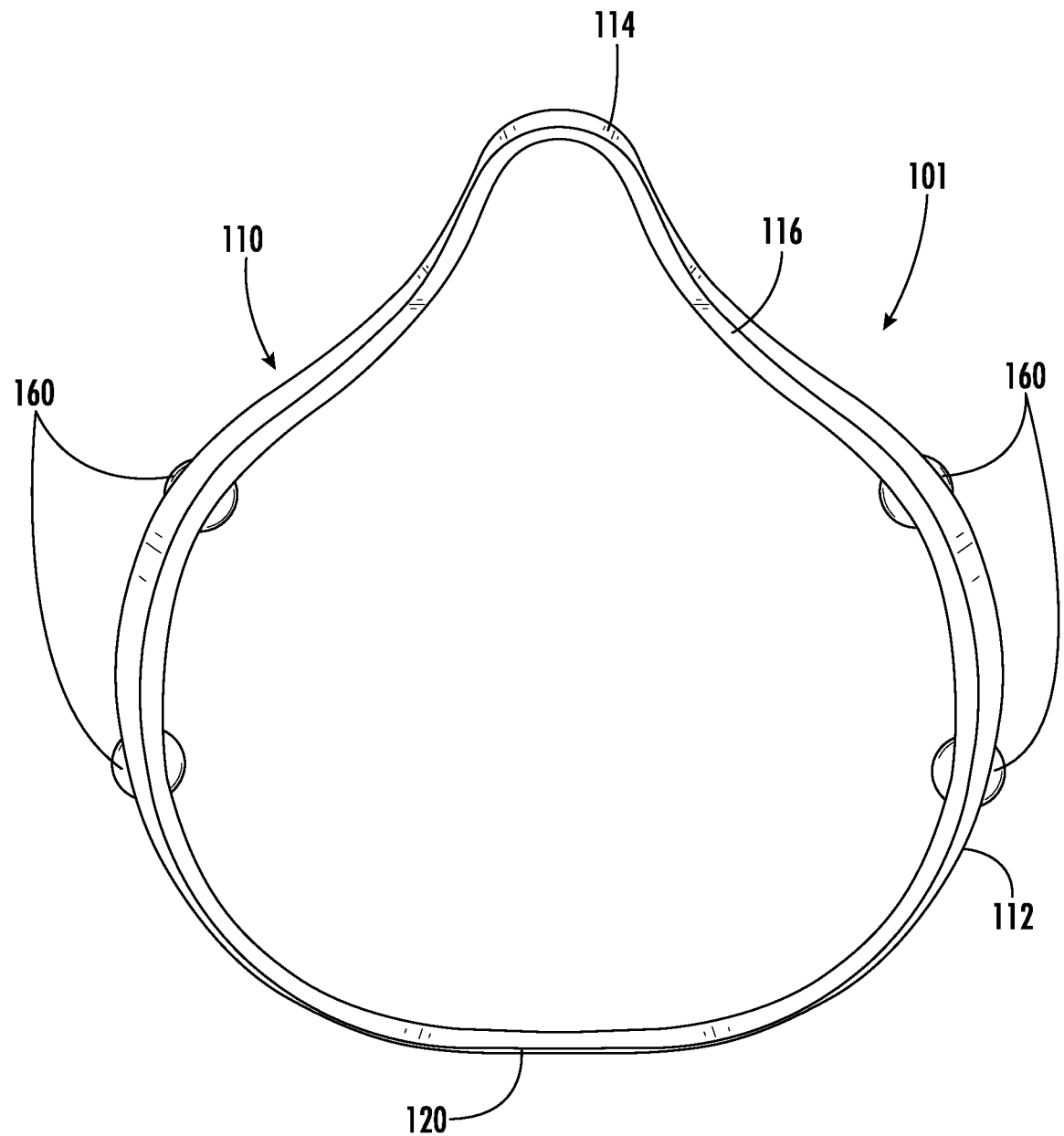
FIG. 11 is a rear view of the second example embodiment of the face mask device.
Figure 12:
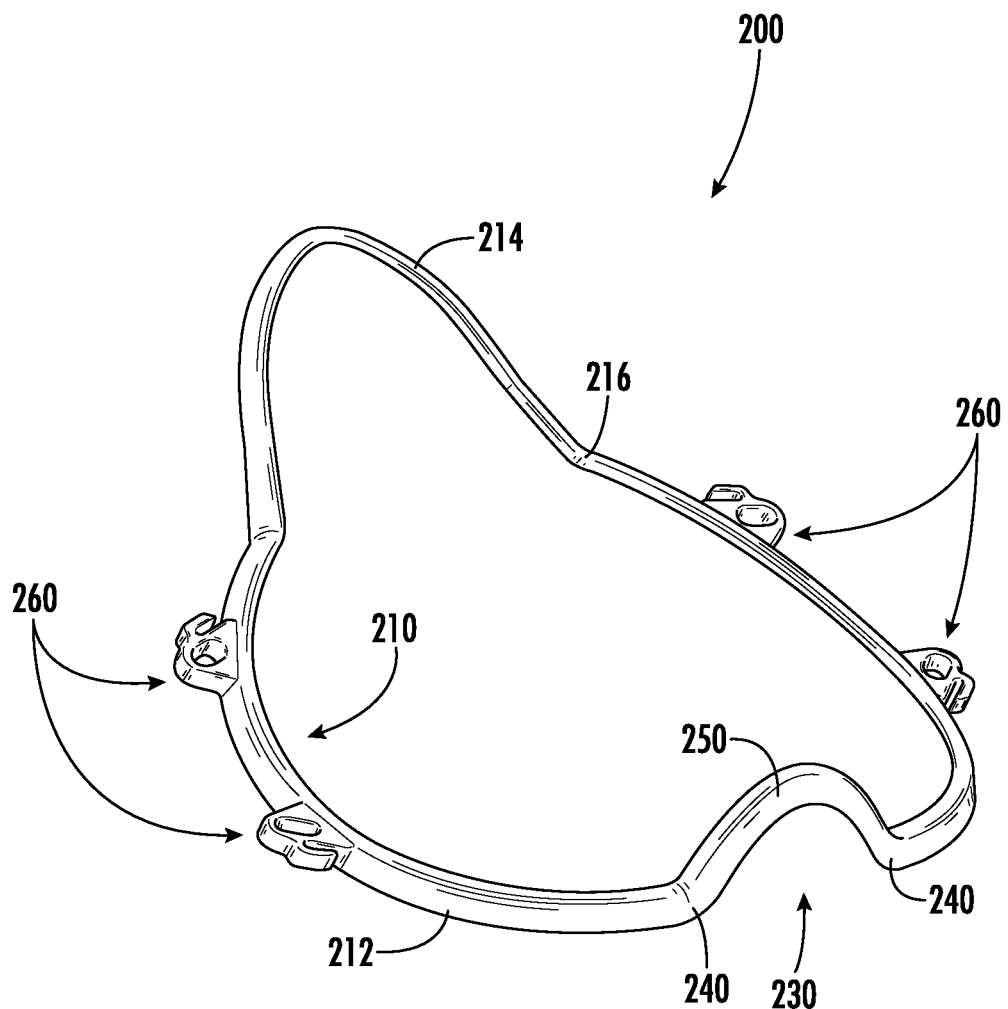
FIG. 12 is an isometric view of a third example embodiment of the face mask device.
Figure 13:
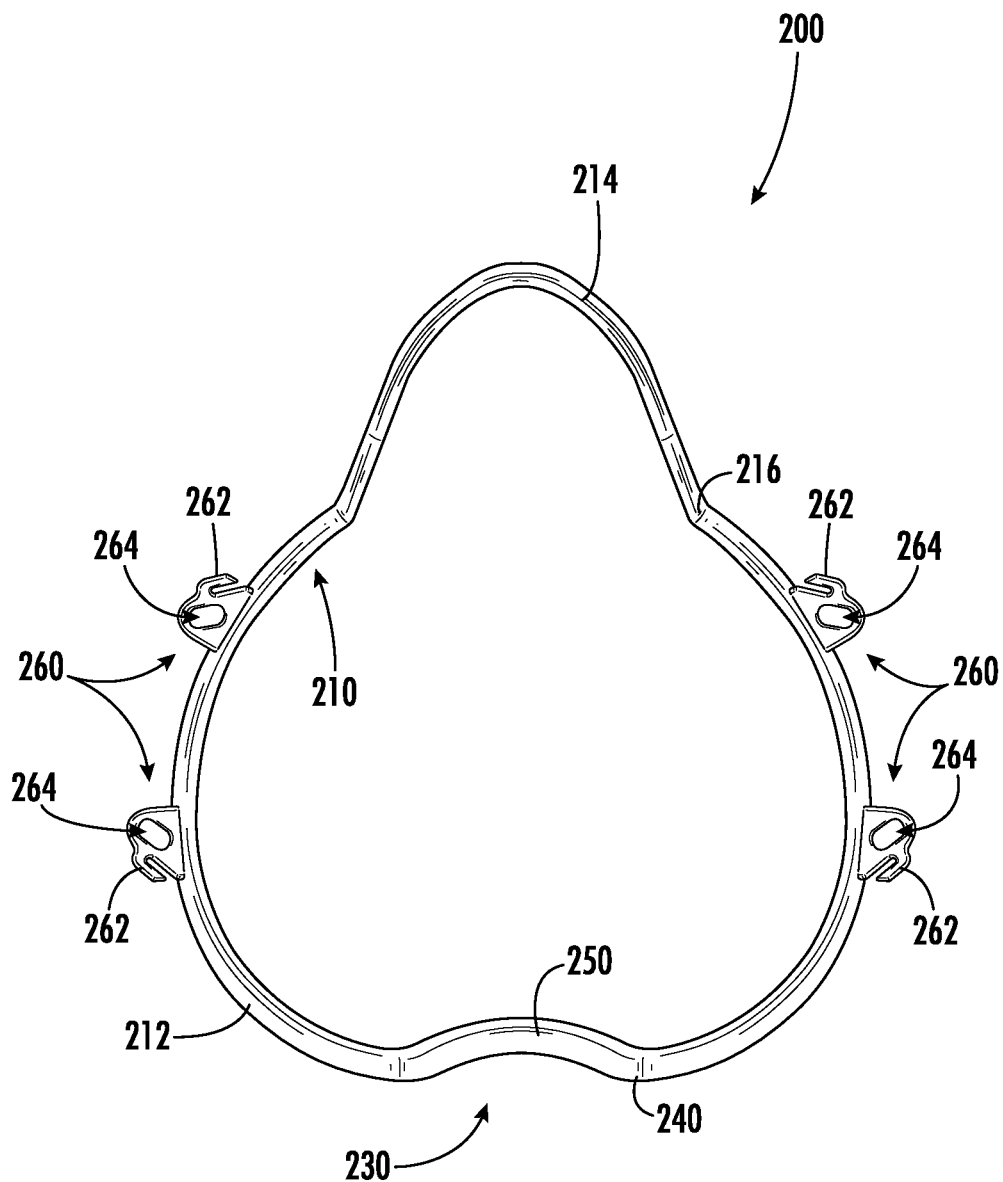
FIG. 13 is a front view of the third example embodiment of the face mask device.
Figure 14:
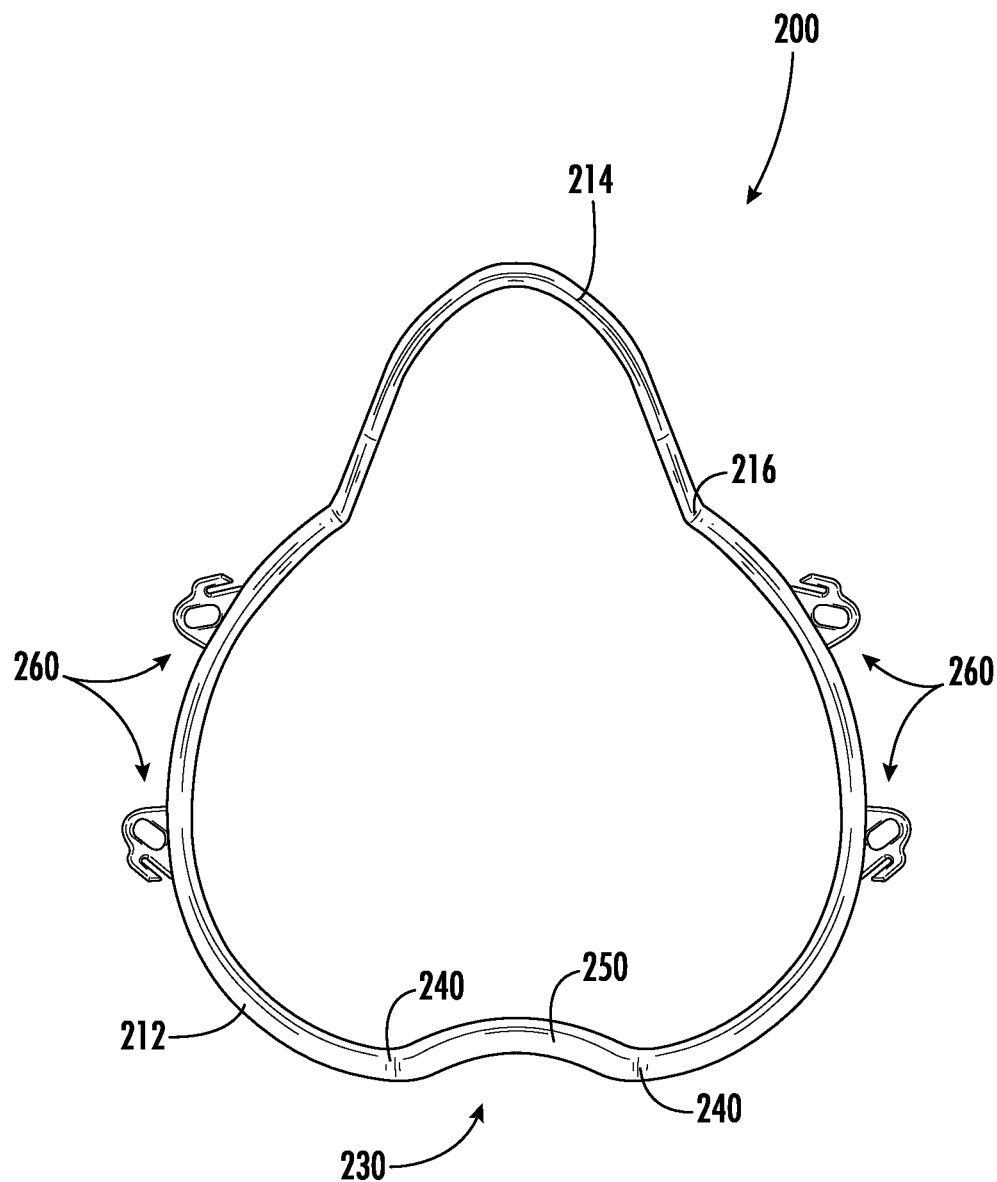
FIG. 14 is a rear view of the third example embodiment of the face mask device.
Figure 15:
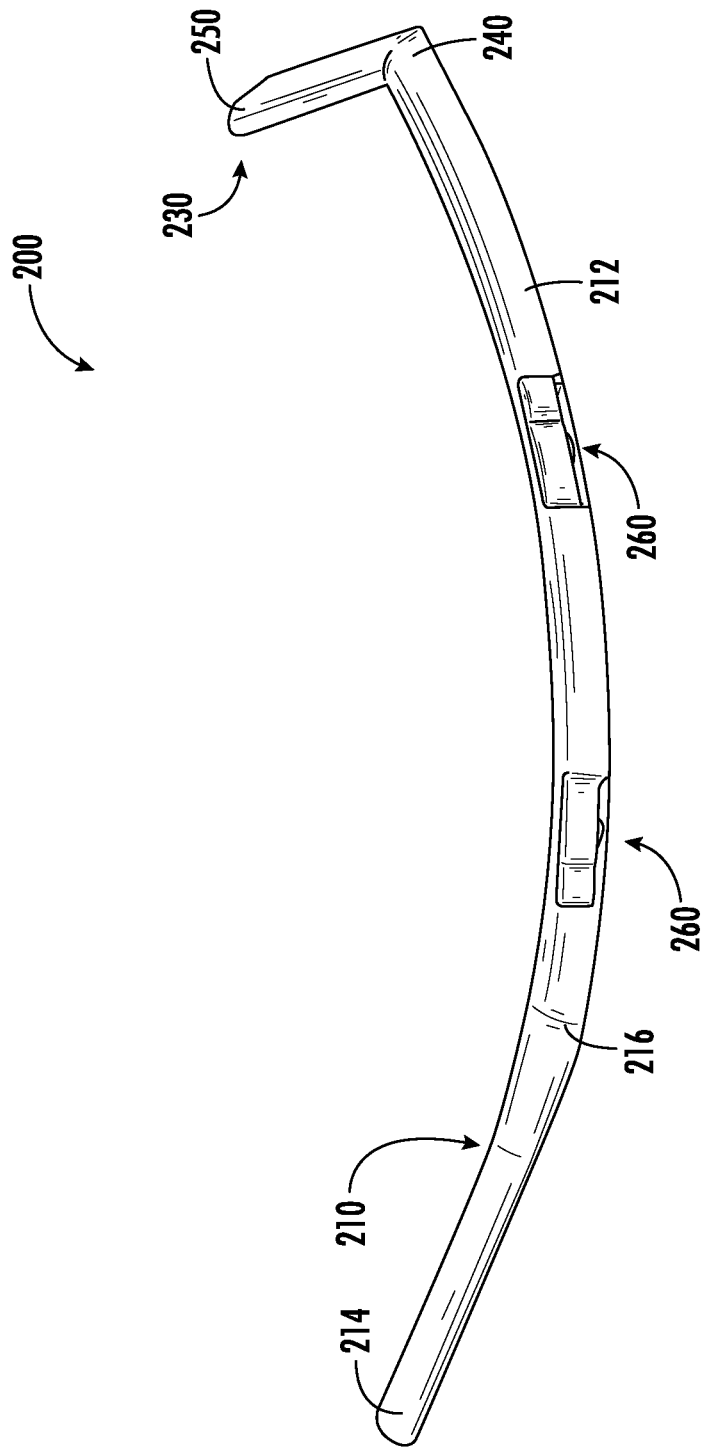
FIG. 15 is a side view of the third example embodiment of the face mask device.
Figure 16:
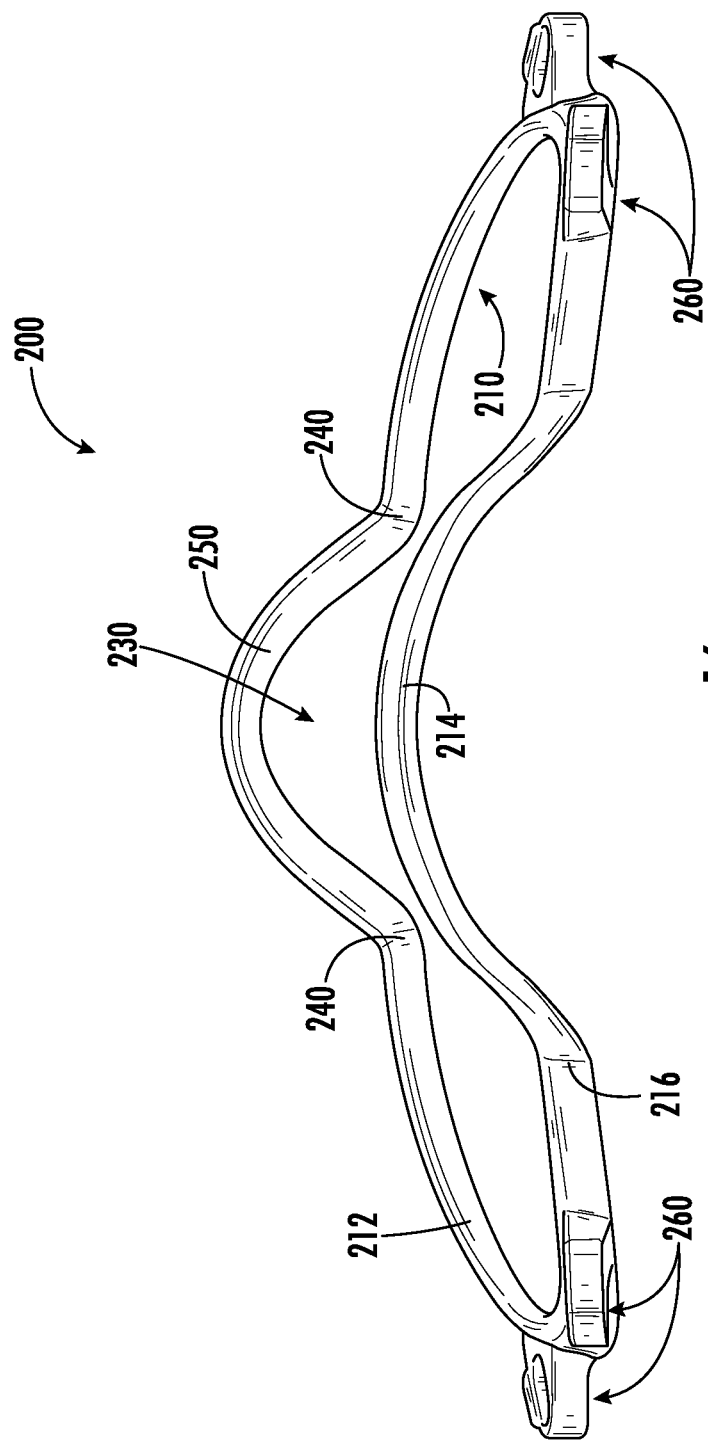
FIG. 16 is a top view of the third example embodiment of the face mask device.
Figure 17:
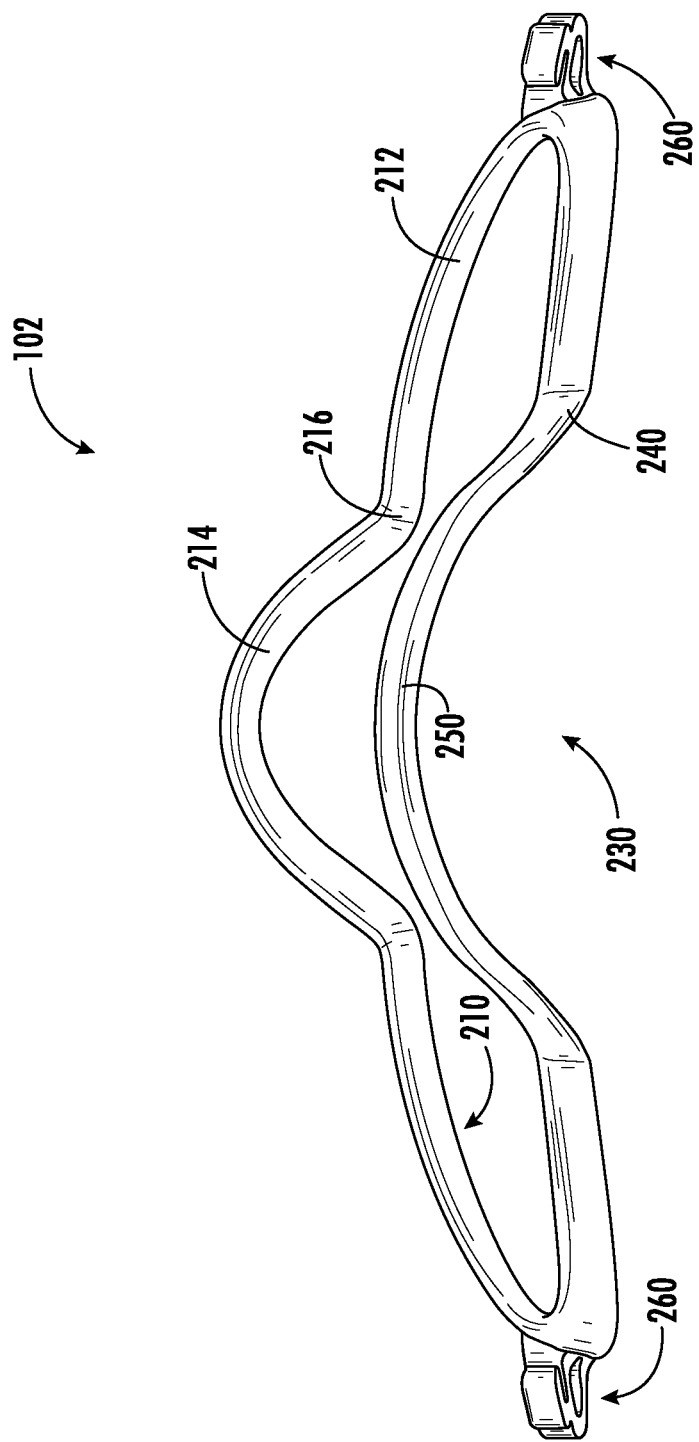
FIG. 17 is a bottom view of the third example embodiment of the face mask device.
Figure 18:
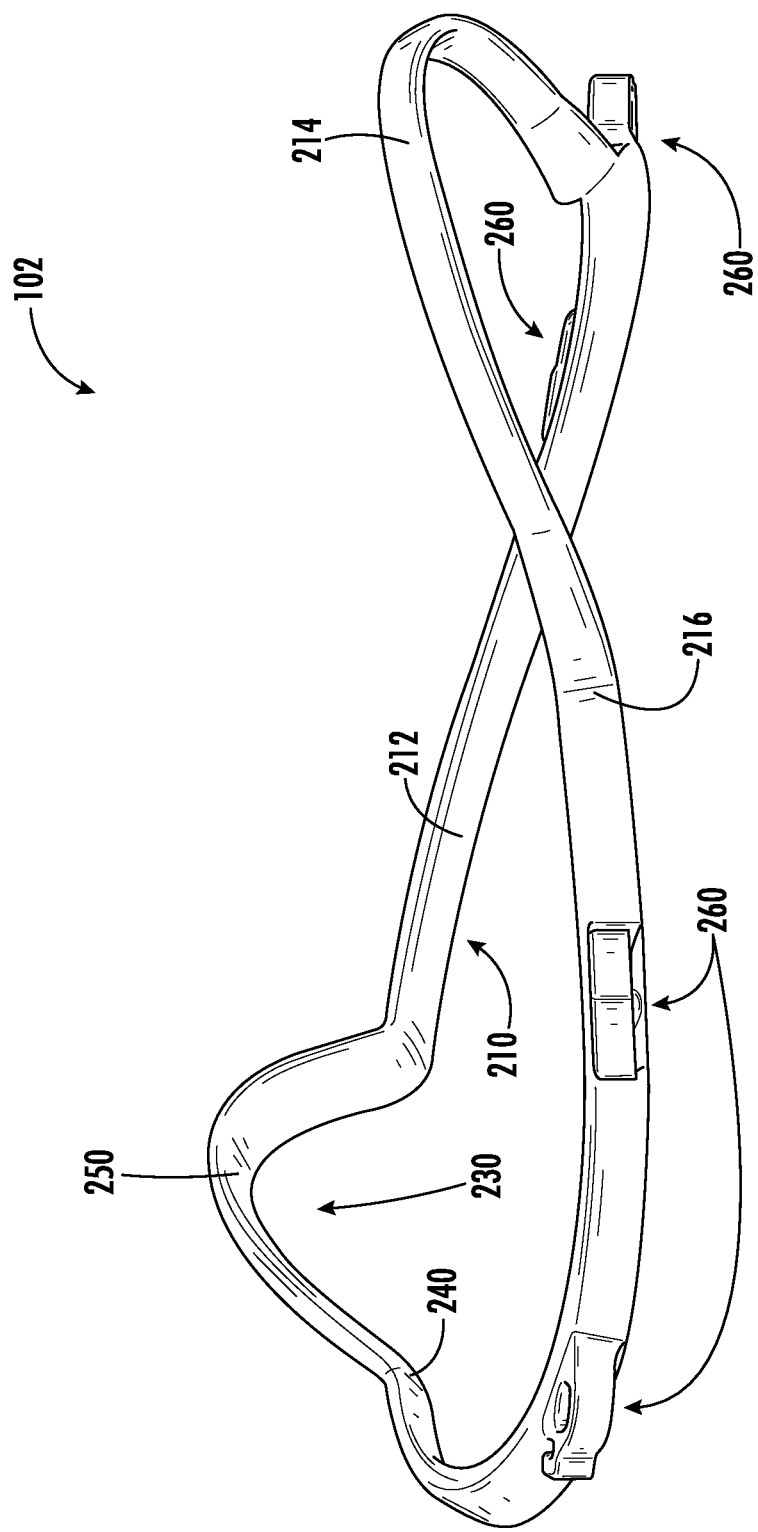
FIG. 18 is a rotated side view of the third example embodiment of the face mask device.

In FIGS. 5-7, the face mask device 100 is shown with a filter material 180 secured over a portion of the user's face, generally designated 10, so that the user's nose 20 and mouth 30 are covered by the face mask device 100. The straps 170 have one or more slots or other suitable attachment feature provided thereon or formed therein, the slots being configured to be secured over and/or about one of the tabs 140. It is advantageous to provide a plurality of slots along the length of the straps 170 such that the length of each strap 170 can be adjusted to secure the face mask device 100 over any of a plurality of differently sized and/or shaped heads. Since the straps 170 are advantageously made of any suitable elastic material, the filter material 180 is compressed between the rear surface 130 of the frame 110 and the skin of the user's face around all, or substantially all, of the perimeter of the frame 110, such that air cannot be inhaled by the user through the user's mouth or nose without the air having passed through the filter material 180. As such, the frame 110 and the filter material 180 act to prevent the infiltration of any unfiltered air around or through the face mask device 100 without the air passing through the filter material 180. In the example embodiment shown, an exhaust port or vent 190 may be provided in the filter material 180 to allow for easier exhalation for the user. In applications in which filtration of exhalants is desired, it is advantageous for such an exhaust port to be omitted from the filter material 180. The filter material 180 can, in some embodiments, be formed to have a generally domed construction, such that the filter material 180 is spaced apart from, and not in direct contact with, the user's mouth 30 while the filter material 180 is secured over the user's nose 20 and mouth 30 by the frame 110.

Aspects of a second example embodiment of a face mask device, generally designated 101, is shown in FIGS. 8-11. The design of the face mask device 101 is generally similar to that of the face mask device 100. As such like-numbered structures in the face mask devices 100, 101 are substantially similar or identical to each other. One key difference in the face mask device 101 is that the tabs 160 are of a different shape from the tabs 140 of the face mask device 100. The tabs 160 are formed by a post extending away from the front surface 130 of the frame 110, on the lower portion 112 thereof. Thus, each post is attached (e.g., rigidly, formed as a single piece, and the like) to the frame 110 at a proximal end of such post, with a generally circularly-shaped body attached at a distal end of such post. As such, unlike the tabs 140 of the face mask device 100, the tabs 160 are configured for attachment of a strap 170 from any direction.

A third example embodiment of a face mask device, generally designated 200, is shown in FIGS. 12-18. As shown, the face mask device 200 includes a frame, generally designated 210, which is configured to be worn on a user's face, and preferably securely over the user's mouth and nose. The frame 210 is held securely against the skin of the user's face, conforming to the contours of the user's face without any gaps therebetween, such that the frame 210 is sufficiently flexible, pliable, and/or bendable to have the same shape as the contours of the user's face, when the frame 210 is pressed against the user's face.

The frame 210 is configured to secure a filter material, or cloth, against the user's face to prevent any infiltration of unfiltered air (e.g., ambient air that has not passed through, or has bypassed, the filter material) through the perimeter formed by the frame 210 of the face mask device 200. In some embodiments, the face mask device 200, when combined with a filter material, or cloth, and applied over a portion of a user's face, creates a substantially tight fit around the user's nose and mouth, thereby preventing such unfiltered air from entering the cavity defined by the frame 210 and the filter material. The face mask device 200 is configured to be used with any suitable filter material or cloth that provides a sufficient or desired filtration level for air that passes therethrough and is ultimately inhaled by the user wearing the face mask device 100. In some embodiments, the filter material is a high performance filtration material.

The face mask device 200 includes a plurality of tabs, generally designated 260, that are rigidly attached on the frame 210. The tabs 260 are configured to engage with (e.g., secure, hold, and the like) a suitable strap (e.g., 170, FIGS. 5-7, which are made from an elastic material) for securing the face mask device 200 onto the user's face. The tabs 260 are advantageously formed in a single piece with the frame 210, but can be manufactured separately and affixed to the frame 210 in some embodiments. The tabs 260 shown in FIGS. 12-18 each have a hook 262 and a hole, generally designated 264, such that a strap can be secured around the hook 262 and/or through the hole 264 in order to secure the face mask device 200 onto and/or over a portion of the user's face.

In the example embodiment shown, the tabs 260 are arranged on the frame 210 as opposing pairs, such that a strap extending between one or more pairs of tabs 260 can be positioned around the back of the user's head and secure the face mask device 200 to the user's face when such a strap is coupled between opposing tabs 260 of the face mask device 200. While the term "tab" is used herein, any suitable attachment mechanism can be used without limitation. Furthermore, the tabs 260 may extend from any suitable surface of the frame 210, including the front or lateral sides thereof. In the example embodiment shown in FIGS. 12-18, the tabs 260 generally extend away from the lateral surface of the frame 210 and are formed in a single piece therewith. The face mask device 200 can be designed to have any suitable number of tabs 260.

The frame 210 of the face mask device 200 is formed from at least two pieces having differently-shaped profiles, namely, a lower portion 212 and an upper portion 214. The lower portion 212 and the upper portion 214 can be formed integrally, assembled together, formed as a monolithic structure (e.g., as a single piece), and the like. The lower portion 212 has a profile that is substantially ovular in shape, but may be customized to fit the shape of a user's face. As such, the lower portion 212 can, in some embodiments, be generally circularly-shaped and/or oblong. In some embodiments, the frame 210 comprises indentions and contours that mimic (e.g., are a same, or substantially similar, shape as) a shape of a user's face (see 10, FIGS. 5-7). At the bottom of the lower portion 212, a protruding portion 250 is connected to the lower portion 212 at the transition points 240. The protruding portion 250 extends at an angle away from the lower portion 212, such that the protruding portion 250 has a generally arcuate profile. While the profile of the lower portion 212 is generally curved, at least to some degree, to better fit the contours of a user's face, the lower portion 212 can be regarded as being, at least to some extent, a generally planar structure. Thus, as shown in FIGS. 12 and 15-18, the direction of extension of the protruding portion 250 is inclined (e.g., perpendicular) relative to the direction of extension of the lower portion 212 adjacent to the transition points 240. The protruding portion 250 is configured to fit against a contour of the user's chin to provide enhanced capabilities to ensure a secure fit under the user's chin and securely hold the filter material under the user's chin.

The lower portion 212 is connected to the upper portion 214 at the transition point 216, which is the inflection point along the frame 210 at which the profile of the frame 210 transitions from the shape of the lower portion 212 to the shape of the upper portion 214. The upper portion 214 is the portion of the frame 210 that is secured over (e.g., on, above, and/or around) the user's nose (see 20, FIGS. 5-7). The upper portion 214 may be formed such that it is not coplanar with the lower portion 212 or may be formed as having a side profile shape that is generally a continuation of the profile shape of the lower portion 212, as shown in at least FIG. 15. It is advantageous for the upper portion 214 to have a generally triangular-shaped profile, such that the upper portion 214 can be readily secured over the bridge of the user's nose.

Figure 19:
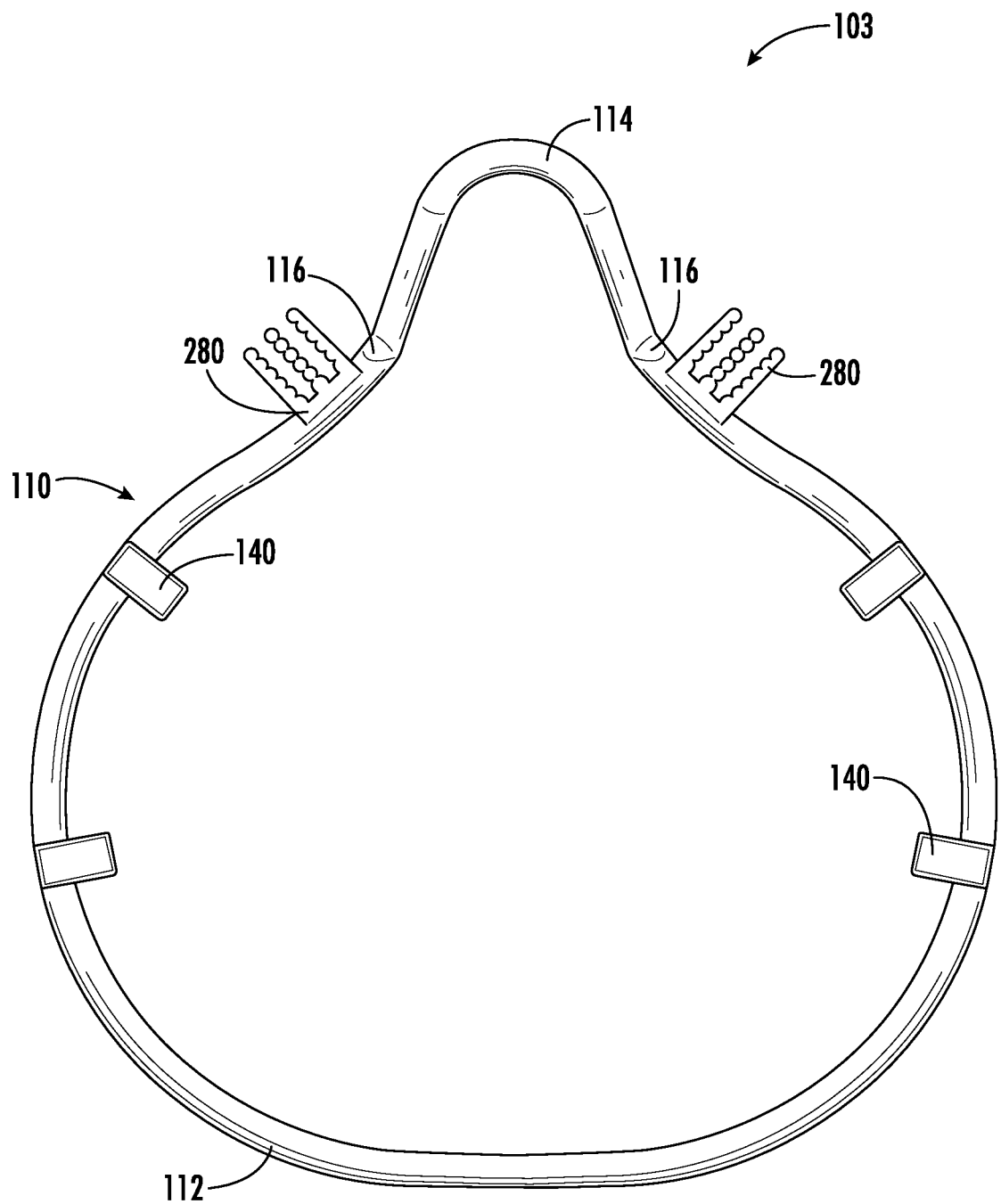
FIG. 19 is a front view of a fourth example embodiment of a face mask device.

FIG. 19 shows aspects of a further example embodiment of a face mask device, generally designated 102. In this embodiment, the face mask device 102 is generally similar to the face mask device 100 of FIGS. 1-7 and structures having the same reference number between the face mask device 100 and the face mask device 102 are the same and will not be described again herein. The face mask device 102 has, on the frame 110 and adjacent to the nose piece connection region 116 on each side of the nose piece 114, a clip 280, which is designed to accept, hold, secure, and/or position a protective face and/or eye covering over a user's face, either alone and/or in conjunction with a protective filter material. An example of such a protective face and/or eye covering is a splash guard and/or face shield, which can block projectiles (e.g., droplets) from making impact with the uncovered portions of the user's face and/or with the face mask device 102 and the filter material. The clips 280 can be provided in any suitable location on the face mask device 102 for attaching a desired protective device, such as an face shield and/or splash guard, onto a portion of the face mask device 102. Any suitable number of clips 280 may be provided as well, including only a single clip 280 in some embodiments. In some embodiments, the clips 280 are configured to attach and/or secure, for example, goggles or eyewear (e.g., glasses) onto the face mask device 102. In some embodiments, the frame of the face mask apparatus further comprises a clip configured to accept, hold, secure and/or position a clear eye/face shield/splash guard over a user's face, optionally wherein the clear eye/face shield/splash guard can be used alone and/or in conjunction with a protective filter material.

Figure 20:
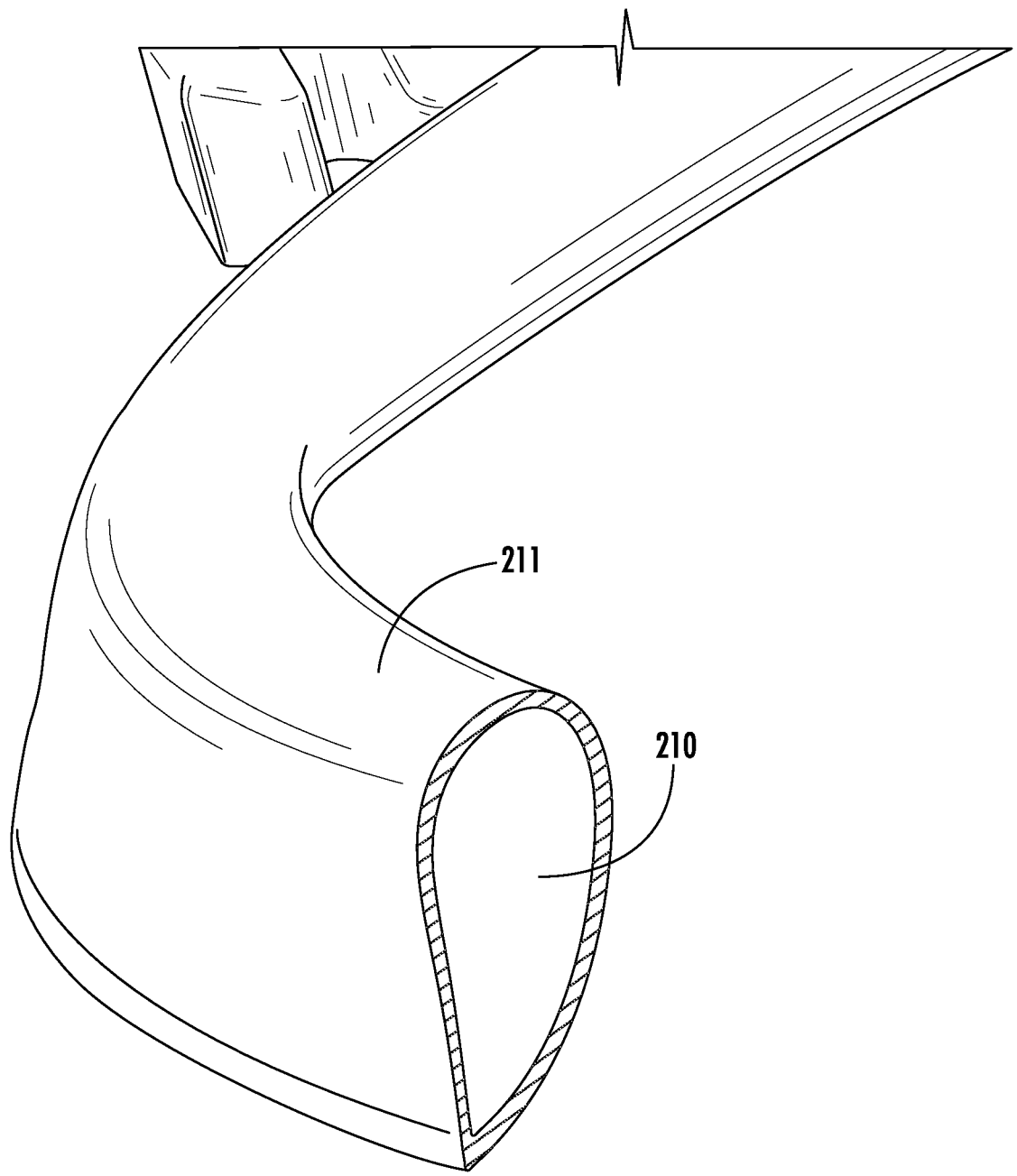
FIG. 20 is a sectional view of a cover over the frame of any of the example embodiments of the face mask device disclosed herein.

The frame 110 of the face mask device 100 can be made from a rigid material, a semi-rigid material, a flexible material, an elastic material, and/or combinations of any such materials. For example, the upper portion 214 can be made from a metal, or other suitable material configured to undergo plastic deformation to be form-fit against the contours of a user's face while being worn on the user's face (e.g., by being pressed against a feature of the user's face, such as the bridge of the user's nose, without discomfort to the user), while the lower portion 212 could be made of a plastic material and the protruding portion 250 could be made from an elastic material. FIG. 20 shows aspects of how the frame 210 can be covered, either entirely or partially, with a cover 211. In some embodiments, the cover 211 can be in the form of a conformal coating, which can include, for example and without limitation, hydrogel, silicone, and the like. The use of such materials over at least a portion of (or all of) the frame 210 can advantageously provide enhanced comfort to the user than a harder material, such as metal and/or hard plastic, from which the frame 210 is formed. In some embodiments, the cover 211 is configured for removable installation over some or all of the frame 210, such as using an interference fit or by using retention tabs on the cover 211 that engage with recesses formed in corresponding portions of the frame 210.

Figure 21:
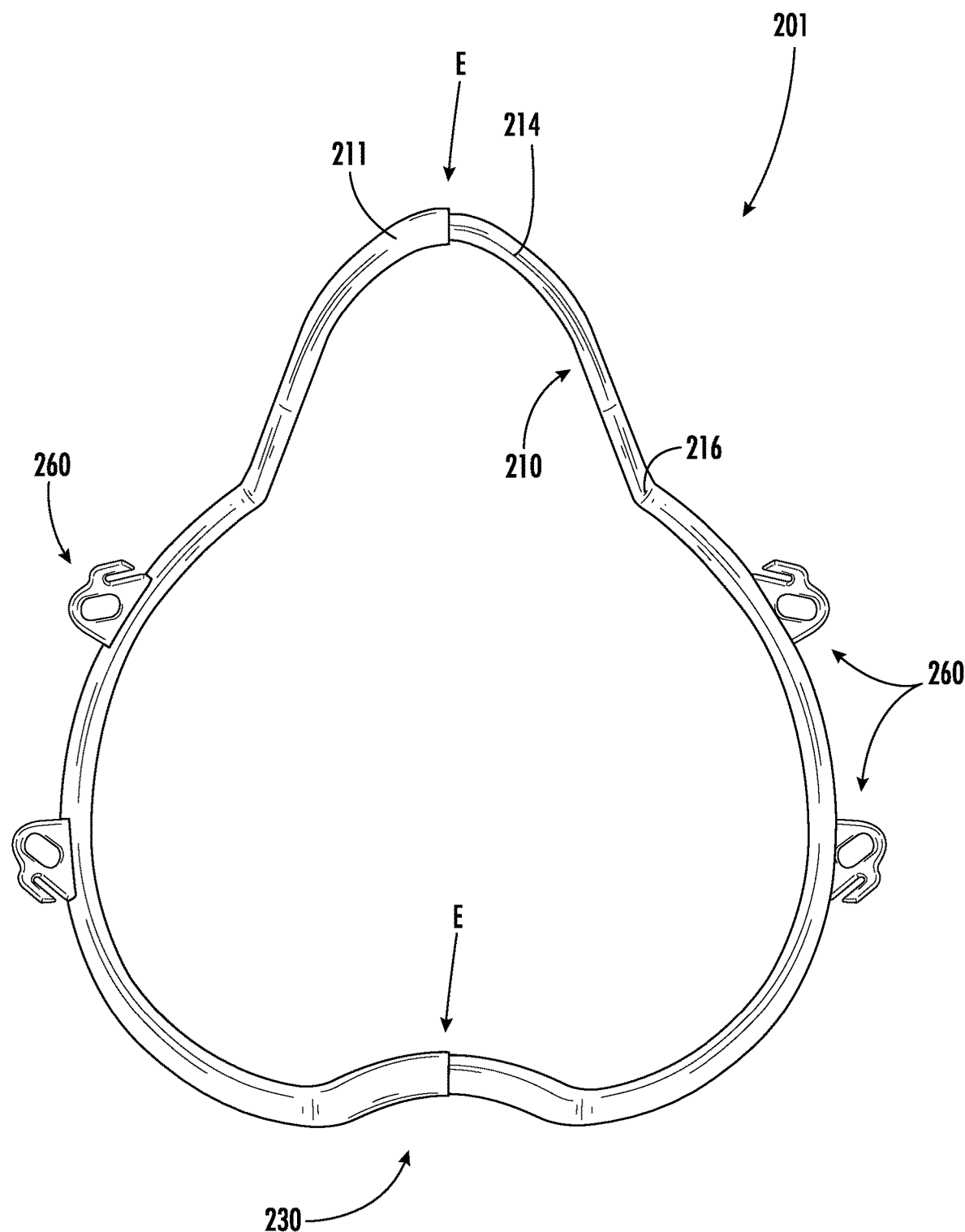
FIG. 21 is a front view of a fourth example embodiment of a face mask device.

FIG. 21 shows an example embodiment of a face mask device, generally designated 201, which has expansion regions E formed in at least the tip of (e.g., the inflection point of the profile of) the upper portion 214. Thus, at the expansion regions E, there are two sections of the upper portion 214 that can move towards or away from each other to make the front profile shape of the upper portion 214 narrower or wider to accommodate a wide variety of nose shapes. In the illustration of FIG. 21, the left section of the upper portion 214 has a cover 211 secured thereover. The sections of the upper portion 214 can be fixed at any of a plurality of positions with respect to each other without limitation.

Figure 22:
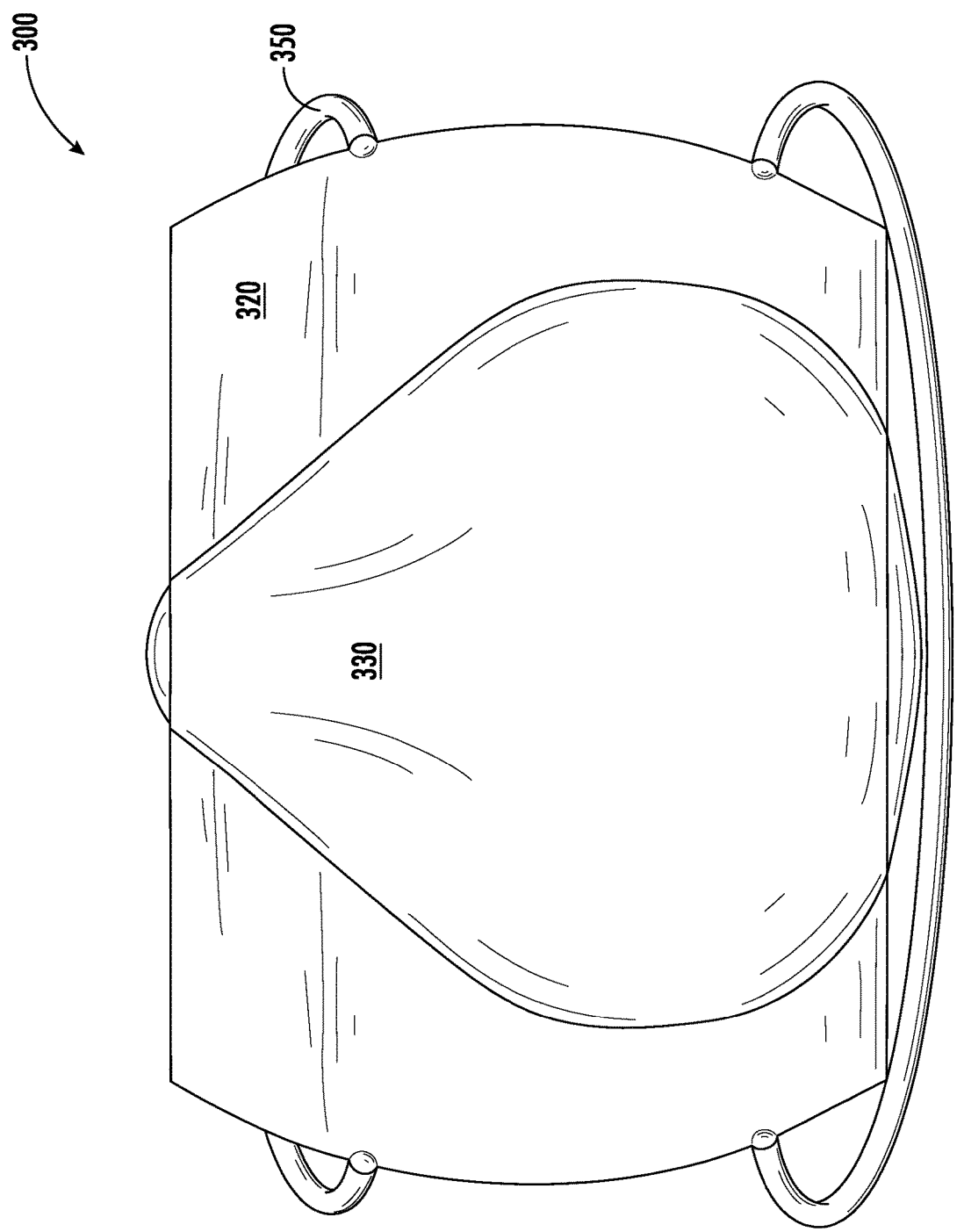
FIG. 22 is a front view of a fifth example embodiment of a face mask device.
Figure 23:
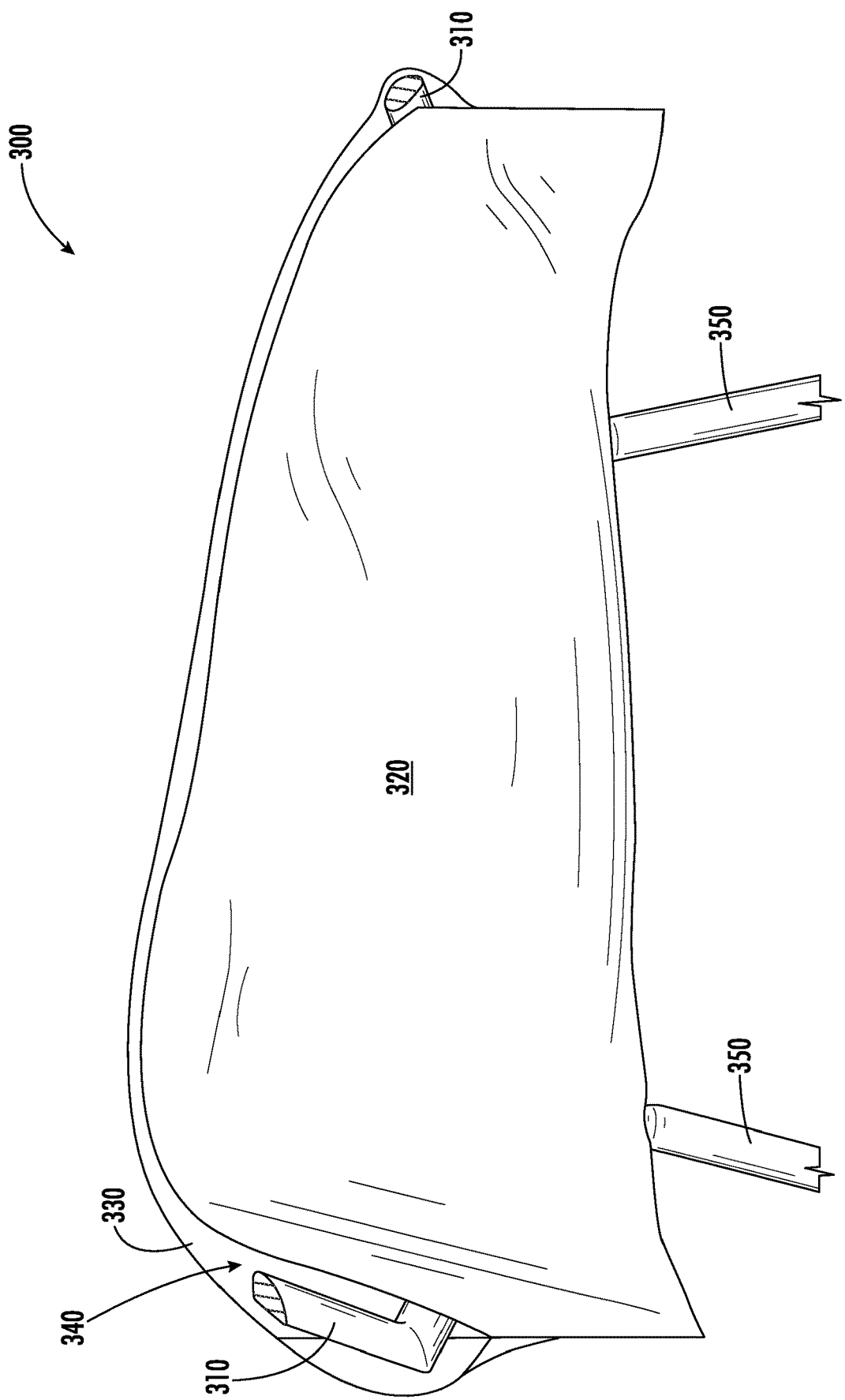
FIG. 23 is a side sectional view of the fifth example embodiment of the face mask device.
Figure 24:
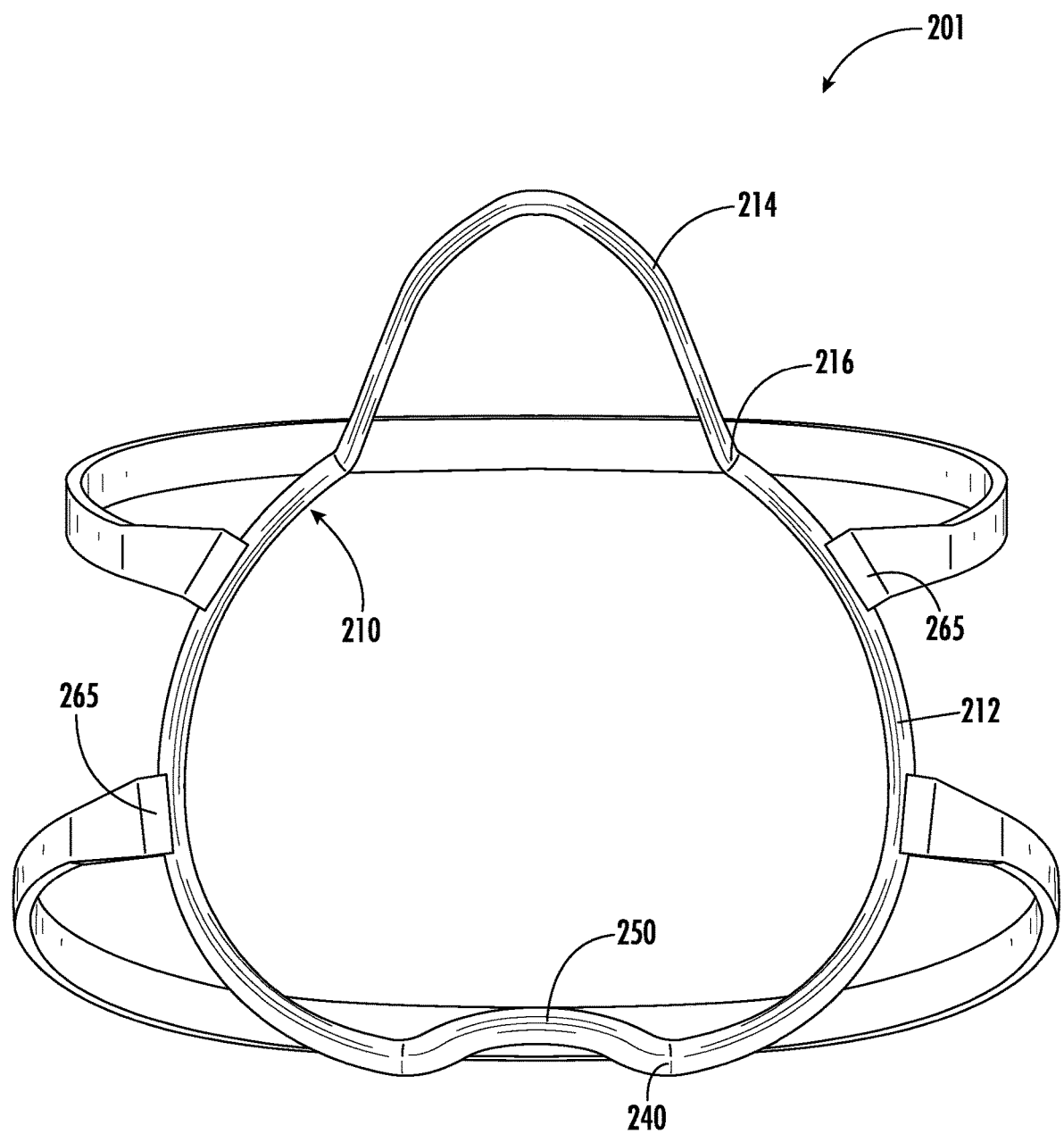
FIG. 24 is a front view of a sixth example embodiment of a face mask device.
Figure 25:
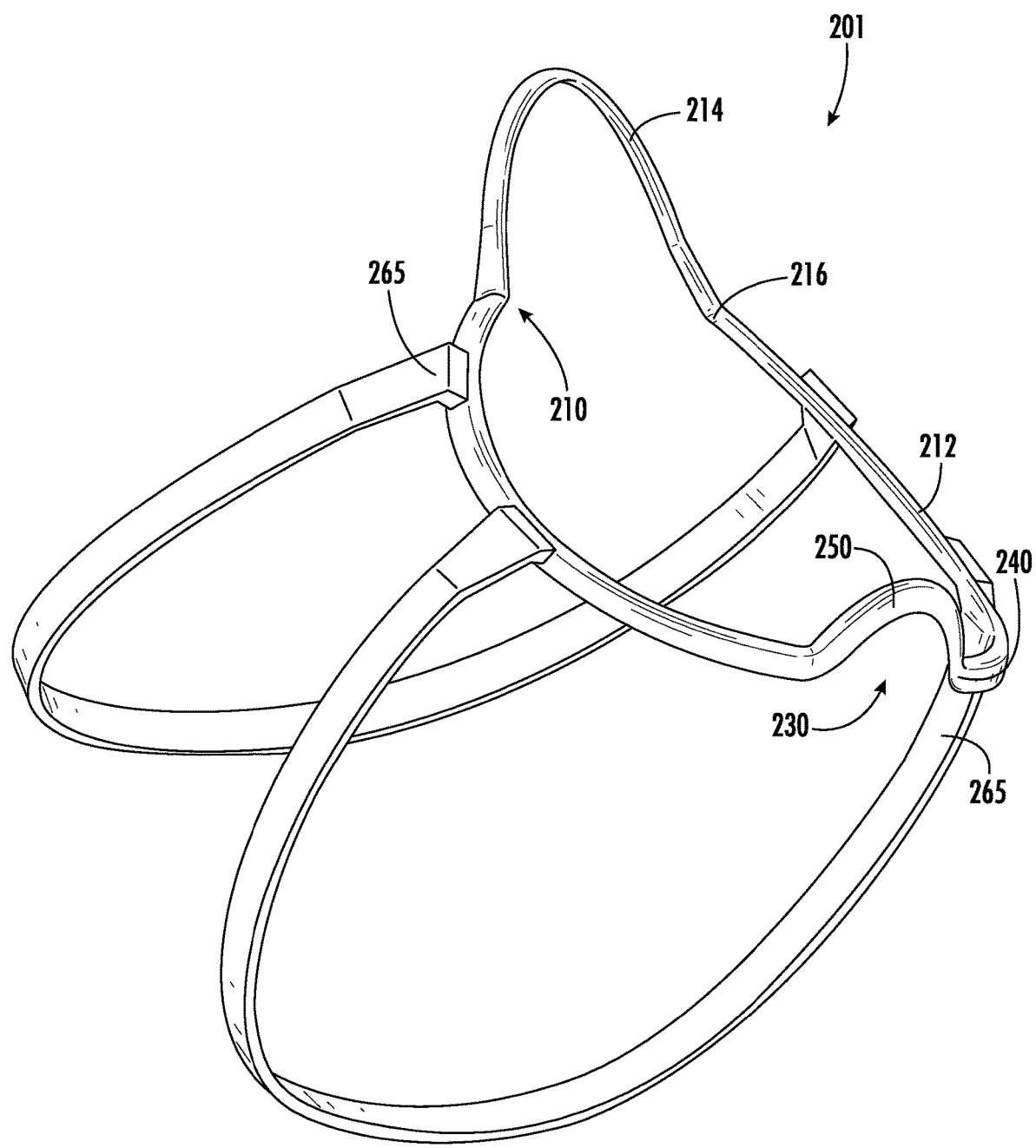
FIG. 25 is an isometric view of the sixth example embodiment of the face mask device.
Figure 26:
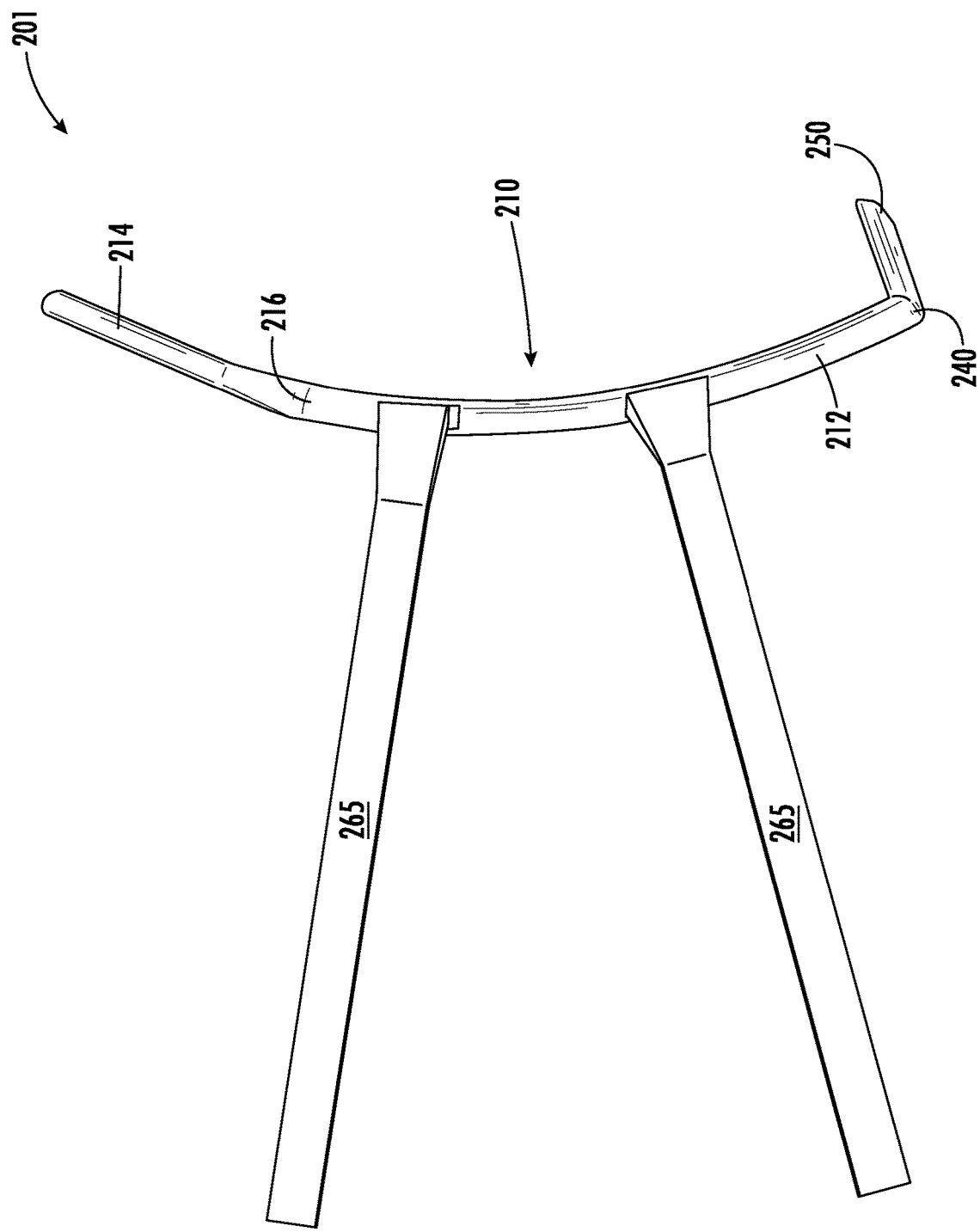
FIG. 26 is a side view of the sixth example embodiment of the face mask device.
Figure 27:
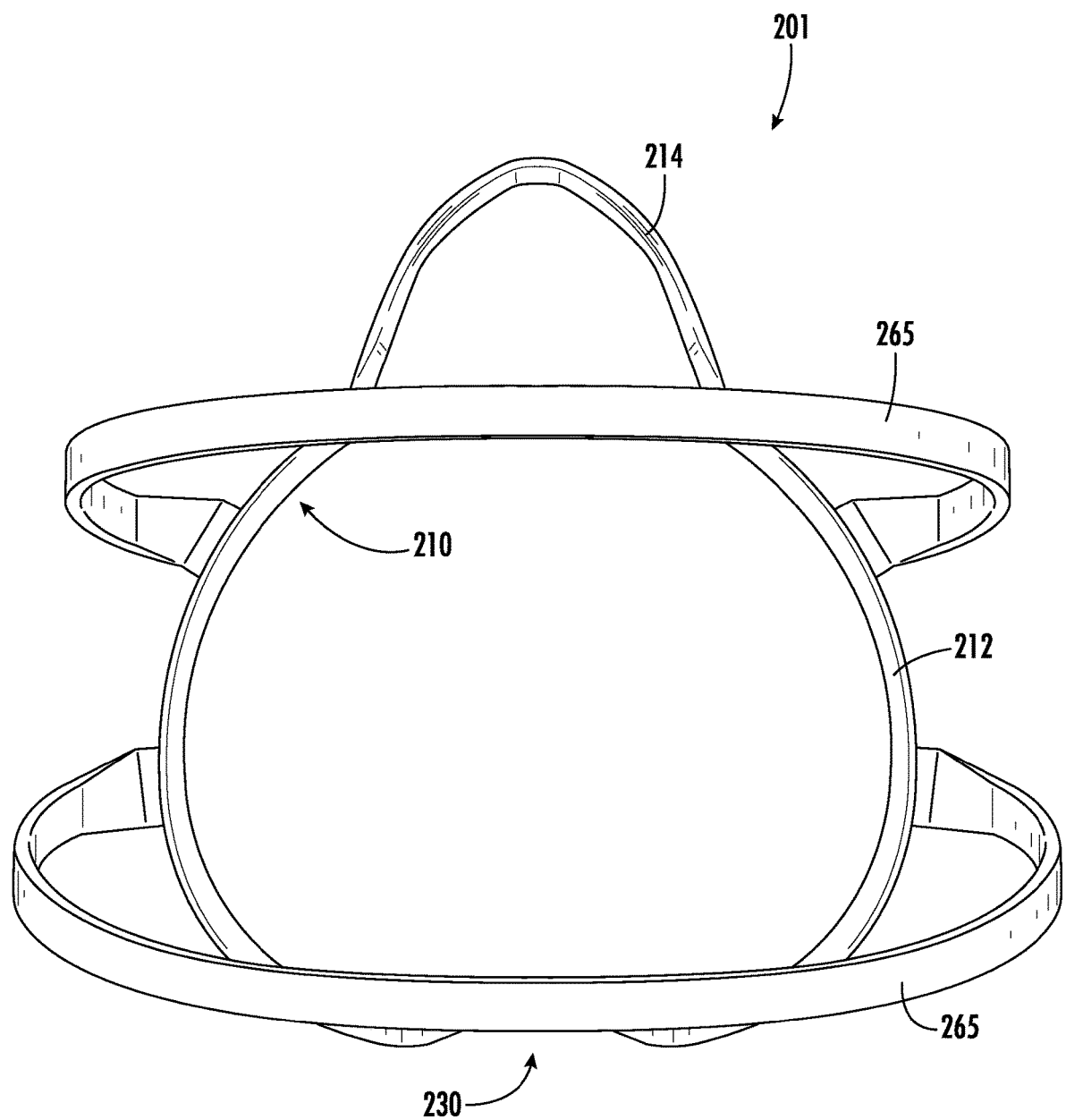
FIG. 27 is a rear view of the sixth example embodiment of the face mask device.

FIGS. 22 and 23 show a further example embodiment of a face mask device, generally designated 300. According to this example embodiment, a frame 310 is positioned within a pocket, generally designated 340, formed between an inner filter material 320 and an outer filter material 330. The frame 310 can be substantially the same shape as either of the frames 110, 210 described elsewhere herein and is shaped so as to press the inner cover 320 between the frame 310 and the portions of the user's face over which the frame 310 is positioned so as to substantially eliminate air gaps between the frame 310, the inner cover 320, and the surface of the user's face. According to this embodiment, the straps 350 are attached to the inner cover 320, which extends laterally beyond outer cover 330 (e.g., in the direction of the circumference of a user's head). The straps 350 can be removably or permanently attached to the inner cover 320. In some embodiments, the arrangement from that shown in FIGS. 22 and 23 can be reversed, such that the outer cover 330 extends laterally beyond the inner cover 320, such that the inner cover 320 is present only in the region of the filter material into which the frame 310 is inserted within the pocket 340.

The straps 350 can be made of any suitable material that will allow the face mask device 300 to be put on or taken off by a user, but is preferably an elastic material that will allow for extension of the straps 350 when put on or taken off by a user. In some embodiments, the inner cover 320 and/or the outer cover 330 may be made of a semi-rigid filter material, such material allowing for the structure of the inner cover 320 and/or the outer cover 330 to be spaced apart from the user's face at least about the user's mouth (see 30, FIGS. 5-7), but preferably at all points away from the contact region defined by where the frame 310 is pressed against the user's face. By using such a semi-rigid filter material, the inner cover 320 and/or the outer cover 330 may be deformed, for example, when the frame 310 is being inserted into the pocket 340, but then will either return to its original shape on its own or with aid of the user's hands, but in any event, the force exerted on the filter material by the flow of air through the filter material induced by respiration of the user will not cause any (e.g., only negligible) deformation in the inner cover 320 and/or the outer cover 330.

The inner cover 320 and the outer cover 330 can be the same or different materials. In some embodiments, the outer cover 330 can act as a pre-filter having larger pores and lower particulate filtration capabilities than the inner cover 320, so as to reduce the amount of large debris that contacts the inner cover 320 and extends the usable life of the inner cover 320. In some embodiments, the inner cover 320 is the same filter material as the outer cover 330, but is capable of achieving higher particulate filtration by virtue of the dual-stage filtration than is capable of being provided by a single-stage filter material having higher particulate filtration efficacy, thereby providing enhanced comfort during respiration compared to the single-stage, higher efficacy filter material. In some embodiments, one or both of the inner cover 320 and the outer cover 320 may comprise electrostatically charged elements (e.g., fibers) that attract and effectively capture particulate matter (e.g., particulate matter having an opposite electrical charge) by binding such particulate matter to the electrostatically charged elements while being worn by the user.

The straps 350 extend around the circumference of the user's head when being worn by the user. The straps 350 exert a generally laterally-oriented (e.g., in the direction tangential to the circumference of the user's head) force against the inner cover 320 at any points where the straps 350 are attached to the inner cover 320, thereby causing the inner cover 320 to be pressed against the skin of the user's face. The outer cover 330 is advantageously rigidly attached to the inner cover 320, whether by an adhesive or other mechanical boding technique (e.g., sewing), such that the perimeter of the outer cover 330 cannot move relative to the portion of the inner cover 320 to which the outer cover is movable. The outer cover 330 advantageously has a shape and size that is substantially similar to the shape and size of the inner cover 320 over which the outer cover 330 is affixed. As such, as the laterally-oriented force exerted by the straps 350 causes the lateral extension of the inner cover 320 to cause the inner cover 320 to be pressed against the user's face, the outer cover 330 is simultaneously also laterally extended in substantially the same direction(s) as the inner cover 320. As such, the pocket 340 formed between the inner cover 320 and the outer cover 330 is compressed (e.g., such that the thickness, in the radial direction of the user's head, is decreased) and the frame 310 is held in a substantially static position within the pocket 340. Therefore, since both the inner cover 320 is compressed against the user's face, the frame 310 is also pressed against the user's face about the perimeter of the frame 310 due to the compression of the pocket between the inner cover 320 and the outer cover 330.

FIGS. 24-27 show example aspects of another example face mask device, generally designated 201, disclosed herein. Like-numbered elements of face mask device 201 and face mask device 200 are the same or substantially similar to the structures described in relation to the face mask device 200. The face mask device 201 shown in FIGS. 24-27 includes straps 265 that are integrally formed with the frame 210 (e.g., formed separately and then attached to the frame 210, such as by applying an adhesive, welding, and the like, or the straps 265 are formed as a single piece with, such as monolithically with, the frame 210). At least one advantage provided by the use of such straps 265 that are rigidly attached to the frame 210 is that it makes it easier for the user to put on the face mask device 201, since the frame 210 does not have to be held in place over the user's face while straps are connected between the tabs (see 260, FIGS. 12-18) to secure the face mask device over and around the user's nose and mouth.

Figure 30:
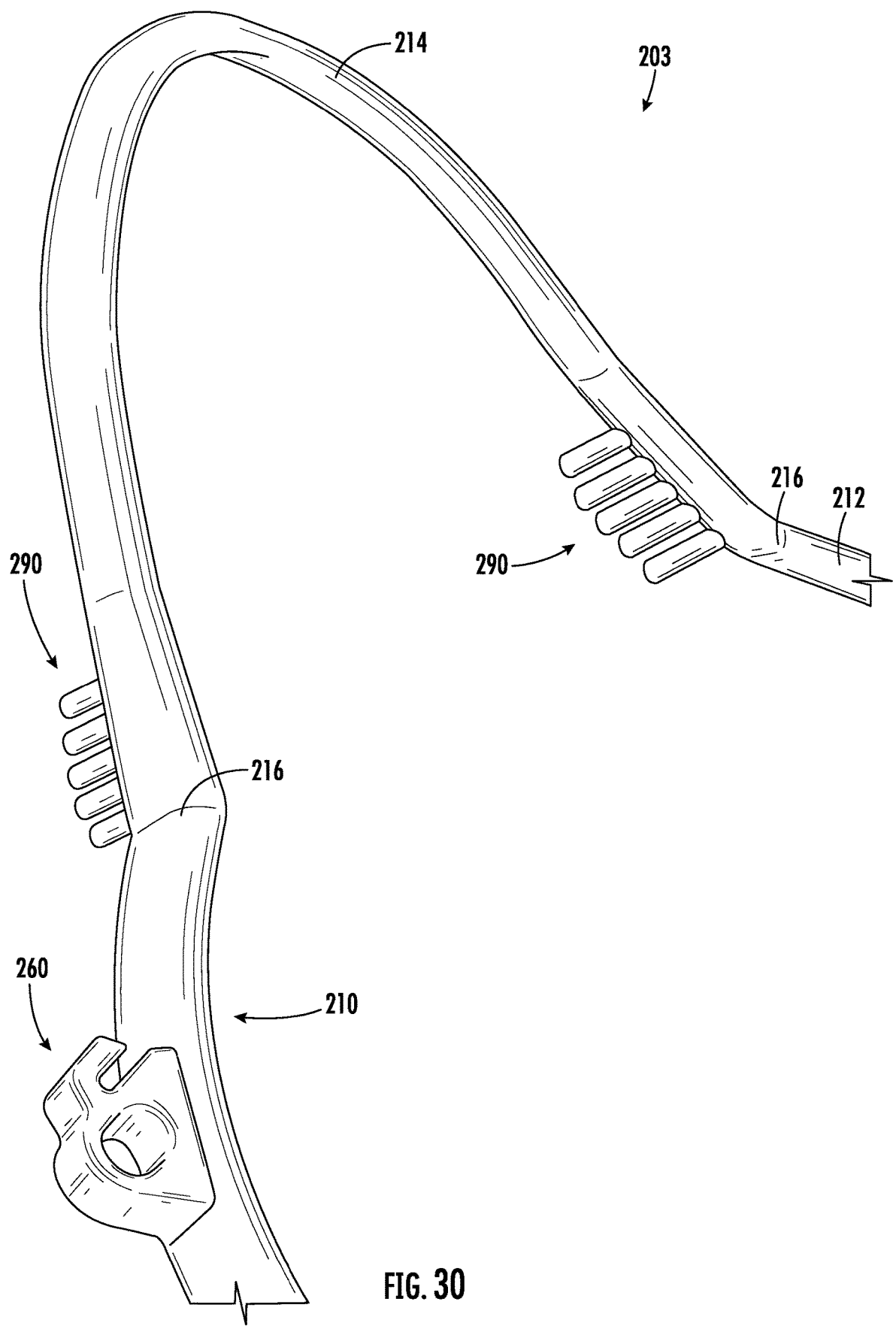
FIG. 30 is a partial view of another example embodiment of a face mask device that is substantially similar to the third example embodiment of FIGS. 11-18 where such features are not shown herein.

Each of the face mask devices 100, 101, 102, 103, 200, 201, 300 disclosed herein can be provided with fitment features around any portion of the frames 110, 210, 310 associated therewith to provide enhanced fitting of the filter material to the unique contours of the face of the user wearing such a face mask device 100, 101, 102, 103, 200, 201, 300. Such fitment features can be, for example, finger- or tab-like protrusions 290, as shown in FIG. 30, that extend away from the frame 210 of the face mask device, generally designated 203, and are inclined in the direction of the user's face when the face mask device 203 is worn, such that the filter material being held over the user's face by the frame 210 is pressed against the skin of the user's face by such fitment features. Any suitable number of protrusions 290 can be provided around any portion of the frame 210 to provide enhanced fit of the filter material against the surface of the user's face. In the example embodiment shown, the protrusions 290 are formed on the upper portion 214, adjacent to the transition point 216. Such fitment features can extend generally radially inwardly and/or outwardly from the perimeter formed by the frame 110, 210, 310. Such fitment features are particularly advantageous in pressing the filter material securely against the user's face to accommodate the facial geometry of each individual user, which is inherently variable between each user. However, such fitment features can be provided around any portion of the frame 110, 210, 310, including around the portions thereof that fit over the bridge of the user's nose, the cheeks, chin, or any other area of the user's face in which the frame 110, 210, 310 contacts the filter material.

The frame 110, 210, 310 of each of the face mask devices 100, 101, 102, 103, 200, 201, 300 disclosed herein can be configured to be compatible with and/or to fit/secure any existing face mask over the user's mouth and nose. This is particularly advantageous in instances in which integral straps of an existing face mask are deteriorated, broken, too large, or otherwise substantially inoperable for securing the existing face mask over the user's mouth and nose. Such a design for the face mask devices 100, 101, 102, 103, 200, 201, 300 has a further advantage in which an existing face mask has reached the end of its serviceable life due to the inability of such integrated straps to secure it over the user's mouth and/or nose, but for which the filter material remains in serviceable condition and could otherwise be reused except for the inoperable condition of the straps. In such embodiments, such inoperable straps could be severed from the existing face mask, leaving only the filter portion thereof, for which the frame 110, 210 of the face mask device 100, 101, 102, 103, 200, 201 is configured to secure over the user's mouth and nose using straps 170, 265, 270 that compress and form a seal around the entire perimeter of the filter material of the existing face mask and the skin of the user's face that forms a substantially continuous and/or uninterrupted perimeter about the user's nose and mouth. Examples of such existing face masks that may be suitable for use with the face mask devices 100, 101, 102, 103, 200, 201 disclosed herein include, but are not limited to, surgical masks, surgical masks with pre-attached or integral eye shields, earloop masks, duckbill masks, cloth material, bandana material, fabric material, filtration material, N95, N99, N100, P95, P99, P100, KN95, FFP3,2,1, and/or custom or non-standard masks. In some embodiments, the face mask devices 100, 101, 102, 103, 200, 201 disclosed herein can be provided with attachment features that allow for attachment of any such commercially-available face mask to, for example, the frame 110, 210 even when the face mask device 100, 101, 102, 103, 200, 201 is not worn by a user. In one example embodiment, the frame 110, 210 can have a two-piece construction that acts in the manner of a snap-in arrangement, clamshell, or any other arrangement, such that the face mask or filter material is rigidly attached to the frame 110, 210 prior to the face mask device 100, 101, 102, 103, 200, 201 being worn by the user.

In some embodiments, using the face mask devices 100, 101, 102, 103, 200, 201, 300 disclosed herein may, by providing a compressive force between the filter material 180 (e.g., also including inner cover 320 and outer cover 330) and the skin of the user's face around the entire perimeter of the frame 110, improve the efficiency and/or efficacy of any existing face masks that are disclosed herein. However, even where efficiency and/or efficacy is the same, the face mask devices 100, 101, 102, 103, 200, 201, 300 disclosed herein are operable to significantly improve the fit and/or comfort of such existing face masks when worn by a user.

In some embodiments, some such face mask devices 100, 101, 102, 103, 200, 201 disclosed herein comprise anchor points for ear loops that may be rigidly attached to pre-fabricated face masks, regardless of the material from which such pre-fabricated face masks are made. Such anchor points advantageously provide attachment points for connecting such ear loops thereto, such that these ear loops are not left to dangle from the user's face in a position in which such ear loops may be caught or pulled in a manner that would dislodge the face mask device 100, 101, 102, 103, 200, 201 from the user's face, thereby breaking the seal formed over the user's nose and mouth by such face mask devices 100, 101, 102, 103, 200, 201. This is especially advantageous for so-called consumer-grade fabric face masks that are intended to be reusable (e.g., by washing the face mask between uses), since such reusable face masks can be removed from such face mask devices 100, 101, 102, 103, 200, 201 and can then continue to be used, either with or without being held in place over the user's face by such face mask devices 100, 101, 102, 103, 200, 201.

In some embodiments, the face mask devices 100, 101, 102, 103, 200, 201, 300 can be provided with an upper portion 114, 214 that has a fixed nose bridge attachment, such that a nose bridge portion of the upper portion 114, 214 can be removed and replaced with a differently-shaped or contoured nose bridge portion to accommodate a different nose bridge geometry. In some embodiments, the face mask devices 100, 101, 102, 103, 200, 201, 300 can be provided with an upper portion 114, 214 that has an adjustable nose bridge attachment, such that a nose bridge portion of the upper portion 114, 214 can be shaped or contoured (e.g., by bending) to accommodate a different nose bridge geometry. Such nose bridge portions can be attached to the frame 110, 210, 310 (e.g., in addition to the upper portion 114, 214) or can constitute a portion of the frame 110, 210, 310 itself (e.g., can be part of the upper portion 114, 214).

Figure 28:
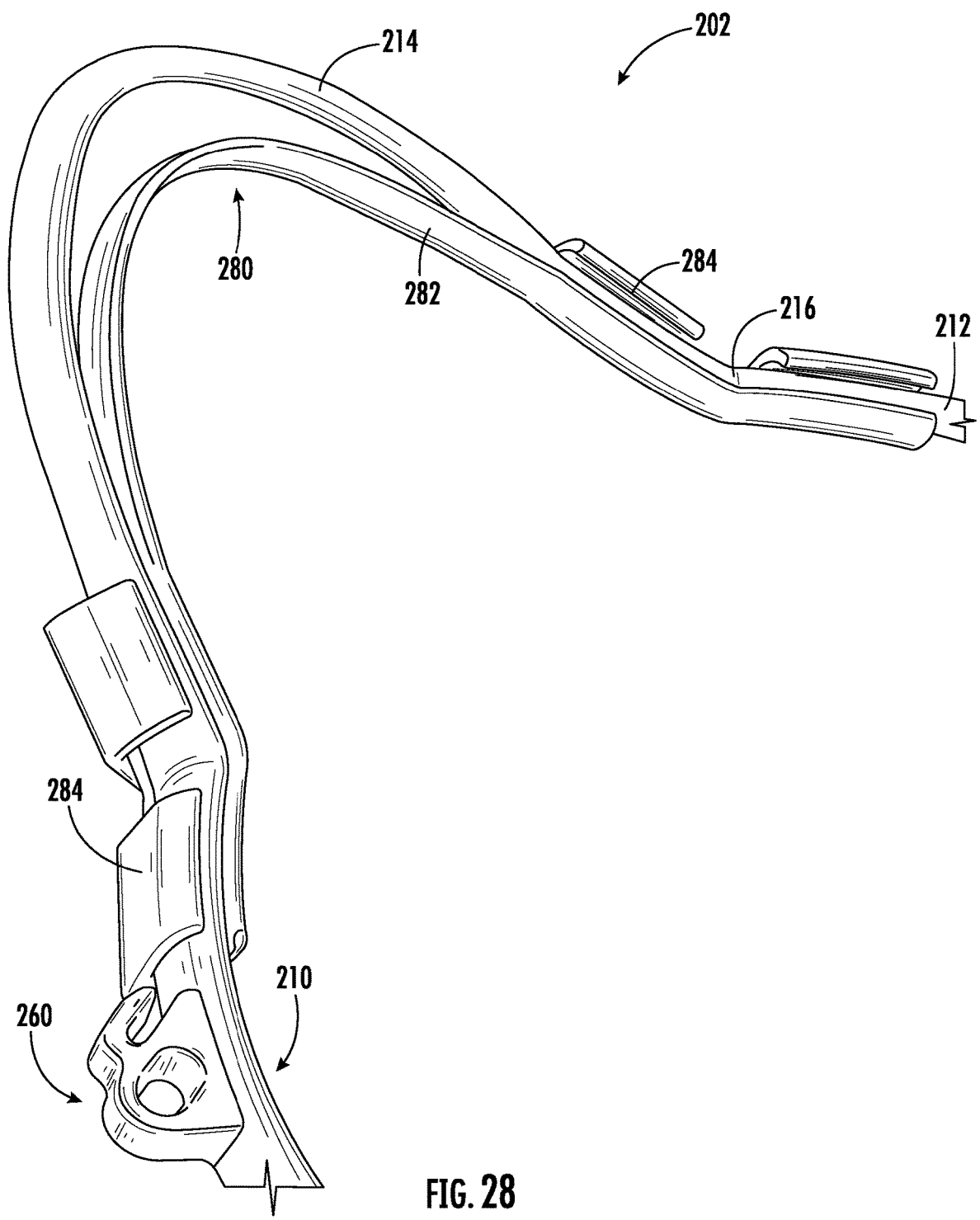
FIG. 28 is an isometric view of a seventh example embodiment of a face mask device having a nose bridge attachment affixed to a frame.
Figure 29:
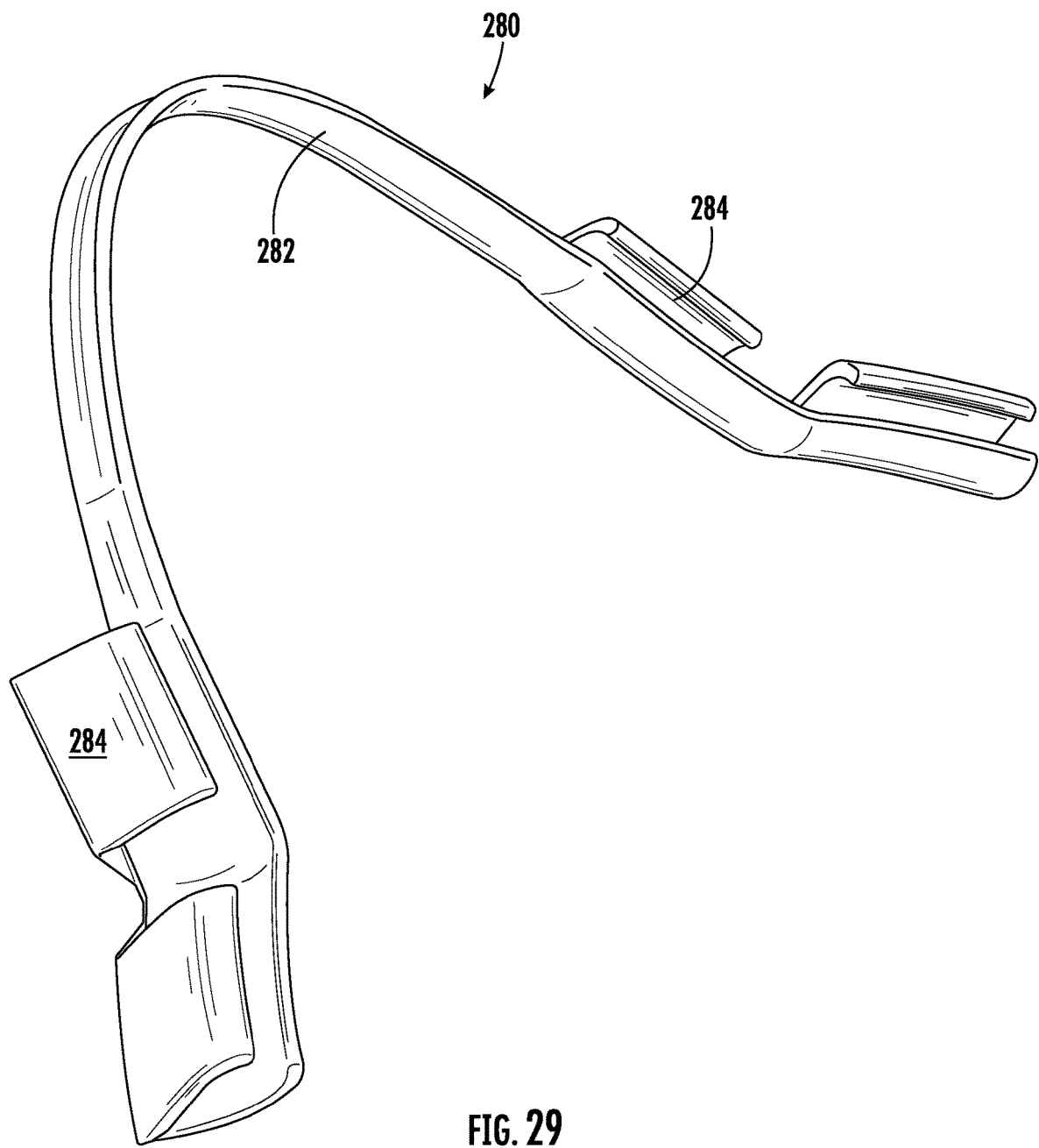
FIG. 29 is an isometric view of the nose bridge attachment of FIG. 28.

FIGS. 28 and 29 show various aspects of an example embodiment of a nose bridge attachment, generally designated 280, that is attachable to a frame 210 to form another example embodiment of a face mask device, generally designated 202. The nose bridge attachment 280 comprises a frame portion 282 with at least one clip 284 (2 clips 284 in the example embodiment shown) positioned adjacent to or at the opposing distal ends of the frame 282, or at any suitable section of the frame 282 to allow for attaching the nose bridge attachment 280 onto the frame 210 of the face mask device 202. The clips 284 and the frame 282 are formed integrally with each other (e.g., as a single piece, or in a monolithic manner). The clips 284 are arranged on the frame 282 so as to rigidly attach on opposing sides of the transition point 216 of the frame 210, such that one clip 284 attaches onto the upper portion 214 and the other clip 284 attaches onto the lower portion 212. The clips 284 may be attached to any portion of the frame 210 to allow fur sufficiently rigid attachment of the nose bridge attachment 280 onto the frame 210. The clips 284 shown in the example embodiment are an interference fit with the frame 210, such that the gap, or recess, formed within each clip 284 is smaller than the portion of the frame 210 over which the clip 284 is to be attached. As shown, the different geometries of the portions of the frame 210 to which each clip 284 is attached also aids in securing the nose bridge attachment 280 onto the frame 210 at a desired position corresponding to a different nose shape of the intended wearer of the face mask device 202. As such, a plurality of differently shaped nose bridge attachments 280 can be provided to allow for the face mask device 202 to be precisely fit onto the face of a user having any nose shape, size, and/or geometry.

In some embodiments, some portions of, or all of, the frames 110, 210, 310 of such face mask devices 100, 101, 102, 103, 200, 201, 300 can be formed of a thermoforming plastic material that is configured such that, when heated to or above a predetermined temperature, such frame 110, 210, 310 can be plastically deformed to conform to the shape and/or contours of a particular user's face to provide an enhanced fit and seal against the surface of the user's face.

In some embodiments, the frames 110, 210, 310 of such face mask devices 100, 101, 102, 103, 200, 201, 300 can have one or more faces or surfaces onto which a decorative design (e.g., a logo of an organization) can be provided. In particular, the cover 211 of the face mask device 201 may be provided with such a decorative design that can be interchangeably attached to portions of, or all of, the frame 210.

Figure 31:
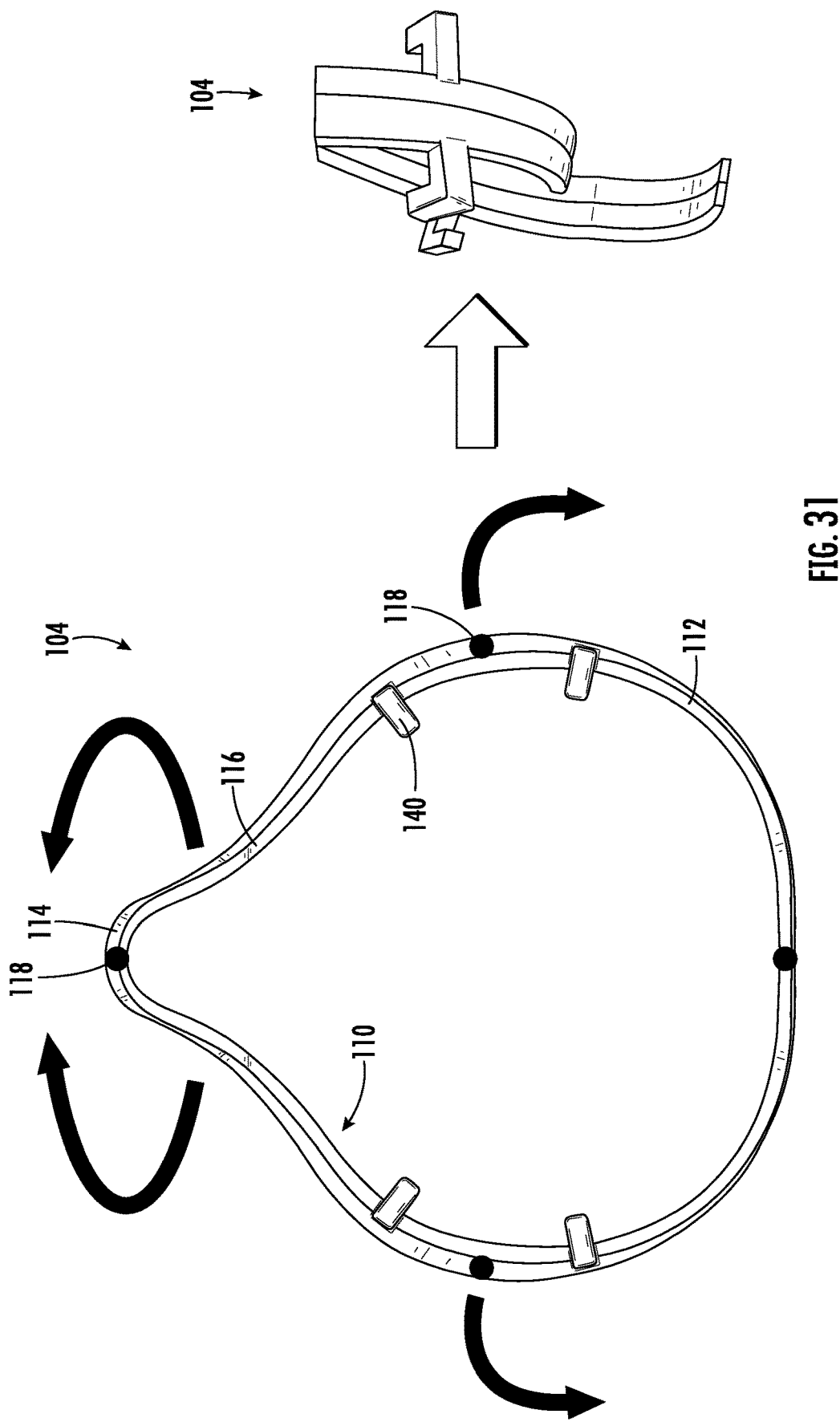
FIG. 31 is a front view showing another example embodiment of a face mask device that is foldable, showing both unfolded and folded positions.
Figure 32:
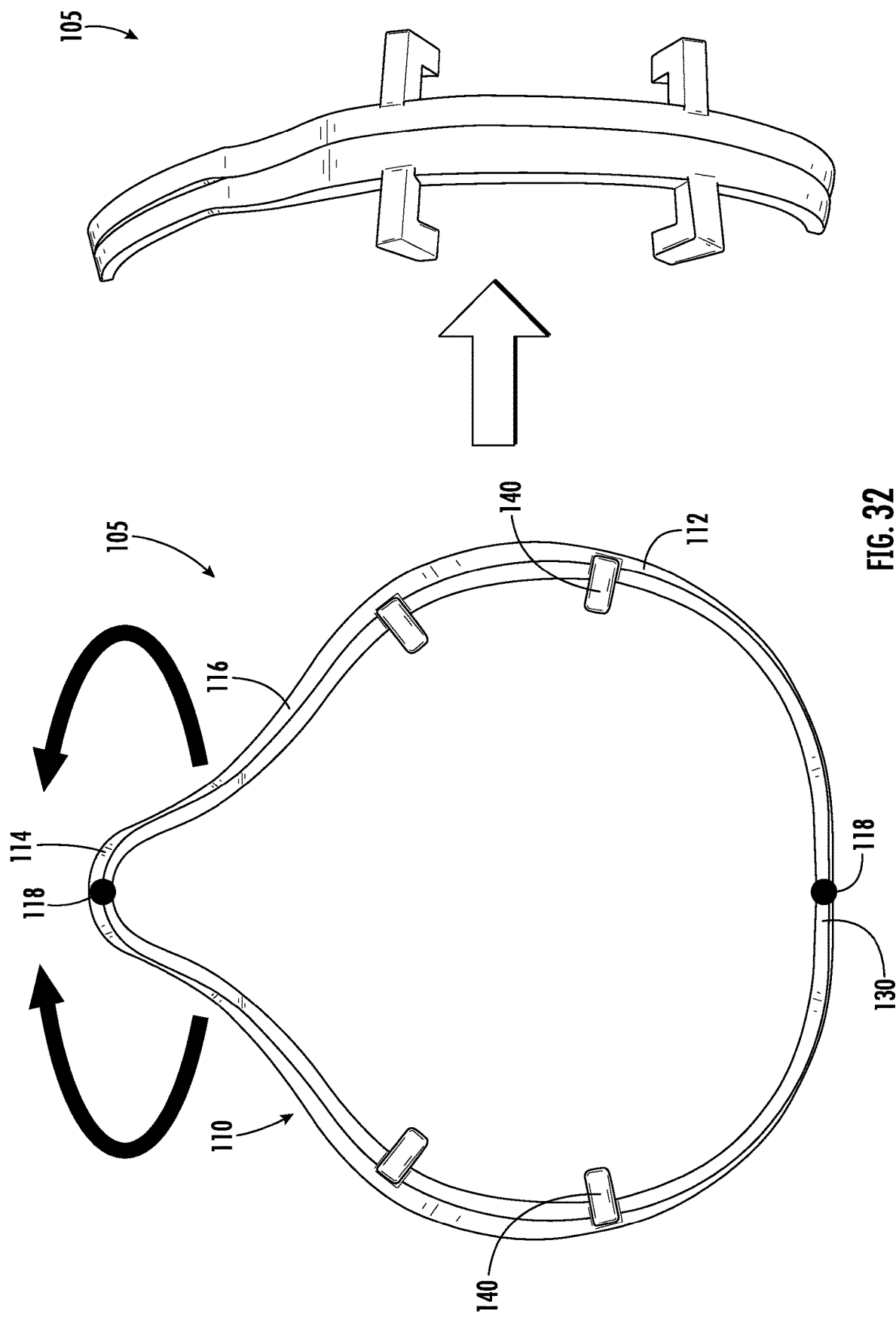
FIG. 32 is a front view showing another example embodiment of a face mask device that is foldable, showing both unfolded and folded positions.

In some embodiments, one or more portions of the frame 110, 210, 310 comprise a hinging structure by which such face mask devices 100, 101, 102, 103, 200, 201, 300 can be folded to decrease the size thereof for transport, storage, retail, and the like. FIGS. 31 and 32 show two example embodiments of such a foldable face mask device. FIG. 31 shows a face mask device, generally designated 104, that has a frame 110 with hinges 118 arranged around locations thereof, such that the face mask device 104 can be folded into quadrants. FIG. 32 shows a face mask device, generally designated 105, that has a frame 110 with hinges 118 arranged around locations thereof, such that the face mask device 105 can be folded in half. The construction and design of the face mask devices 104, 105 is substantially similar to that of the face mask device 100 shown in FIGS. 1-7 and like reference numbers designated like structures. As such, features described with respect to face mask device 100 will not be repeated herein for face mask devices 104, 105. The hinges 118 can be of any suitable design that allows for folding of the portions of the frame 110 and can be positioned at any point about the frame 110 to allow for any desired folding geometry of the frame 110. The hinges 118 disclosed herein can be provided, without limitation, as part of any face mask device, including any of the example embodiments of the face mask devices shown and described herein.

In some embodiments one or more portions of the frame are segmented so as to be capable of being assembled together from physically separate components, each component having an assembly feature that is compatible with an assembly feature formed on an adjacent corresponding segment of the frame 110, 210, 310. Such assembly features can be, for example, a keyed male part on one end of a segment and a keyed female part on one end of an adjacent segment, such that the male part and the female parts have a substantially similar profile and are configured to allow insertion of the male part within the female part. In some such embodiments, the male part is lockably insertable within the female part to prevent removal thereof (e.g., without actuating a release mechanism to release the locking feature that is holding the male part within the female part).

In some embodiments, the frame 110, 210, 310 of the face mask device 100, 101, 102, 103, 200, 201, 300 is made of a material having anisotropic mechanical properties. An example of such anisotropic mechanical properties is that the frame 110, 210, 310 may be more flexible in one direction than in another direction and/or can provide enhanced rigidity in certain direction(s) and enhanced flexibility in other direction(s).

In some embodiments, the straps, whether integrated with, or removably attachable to, the frame 110, 210, 310 are advantageously adjustable to have any of a plurality of different lengths to accommodate head sizes of any of a plurality of circumferences. In some embodiments, the straps disclosed herein can be formed as ear loops instead of the straps that wrap around the back of the user's head.

The frames 110, 210, 310, as well as any portions thereof, of any of the face mask devices 100, 101, 102, 103, 200, 201, 300 disclosed herein can be provided in any of a plurality of different sizes and/or geometries to provide enhanced fitment over and around the nose and mouth of any user, regardless of the head and/or face geometries of such user. By way of example and not limitation, such sizes can include child, extra small, small, medium, large, extra large, and the like. As such, a user may select a face mask device 100, 101, 102, 103, 200, 201, 300 of a suitable size from a plurality of differently sized and/or shaped face mask devices 100, 101, 102, 103, 200, 201, 300 that best suits their particular head and/or face geometries, contours, shapes, and the like.

Another advantage provided by any of the face mask devices 100, 101, 102, 103, 200, 201, 300 disclosed herein is that, because the filter material is firmly pressed over the skin of the user's face around the entire perimeter thereof, as defined by the frame 110, 210, 310, there is no (e.g., only negligible) emission of exhaled air in the upwards direction. This is particularly advantageous for person who wear an eye covering, whether the eyewear is prescription eyewear (e.g., glasses, goggles, and the like), cosmetic eyewear (e.g., sunglasses), or protective eyewear (e.g., impact-resistant glasses, goggles, and the like), since it is a very common occurrence for users who need to wear eyewear while wearing known face masks to experience significant visibility issues due to fogging of their eyewear due to the moisture of the exhaled air escaping out through the top of such known masks that are not sufficiently sealed about the user's nose.

In some embodiments, the frame 110, 210, 310 of any of the face mask devices 100, 101, 102, 103, 200, 201, 300 disclosed herein can be adjustable. For example, adjustable portions may be provided in the frame 110, 210, 310 at the portions thereof that are over and/or adjacent to the user's cheek, chin, and nose, respectively. Such adjustable portions can be formed in the manner of a press fit, or interference fit, arrangement. In some embodiments, these adjustable portions can be formed using so-called "peg and hole" designs in which one segment has one or more pegs and another segment has a plurality of holes into which the peg may be affixedly inserted to secure the segments together, such that the effective length of the segments assembled together can be any of a plurality of values based on into which of the plurality of holes the peg is inserted. In an example embodiment, the frame 110, 210, 310 may have the same shape as is shown in any of the example embodiments disclosed herein, but such frame 110, 210, 310 may be segmented, such that the frame 110, 210, 310 is formed out of four separate pieces, the end of each piece being either the male portion (peg) or the female portion (plurality of holes) and being pressed together according to the user's desired shape of the frame that best fits the user's face.

Also provided are face mask systems and/or kits comprising a face mask apparatus as disclosed herein and one or more protective filter materials. The face mask apparatus can be reusable and the one or more protective filter materials can be disposable. Optionally, such a kit can comprise one or more types of protective filter materials that a user can select from depending on the application and/or conditions.

Methods of protecting a subject from exposure to a pathogen or airborne substance are provided, comprising providing a subject and applying to the subject's face a face mask apparatus of any of the above claims with a protective filter material.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by," is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A face mask device configured to be used with any suitable filter material, the face mask device comprising:
    a frame configured to be worn on a user's face to secure a separate and detached filter material on the user's face; and
    one or more straps configured to be attached to the frame for applying a tension force to the frame to press the frame against a surface of the user's face over which the frame is positioned;
    wherein the frame is configured, due to the tension force exerted by the one or more straps, to flex and/or conform to the surface of the user's face to securely press the separate and detached filter material against the user's face with which the frame is in contact; and
    wherein the frame is configured to secure a separate and detached filter material directly against the surface of the user's face to prevent unfiltered air from being inhaled by the user without passing through the filter material;
    wherein the frame comprises an upper portion, a lower portion and a protruding portion, wherein the upper portion comprises metal material, the lower portion comprises a plastic material, and the protruding portion comprises an elastic material.

2. The face mask device of claim 1, wherein the face mask device is configured, in a region over which the frame is adjacent to the user's face, to press the filter material against the user's face to form a substantially continuous contact area around the user's nose and mouth to prevent air from being inhaled by the user without passing through the filter material.

3. The face mask device of claim 2, wherein the filter material is configured to filter air inhaled by the user as the air passes through the filter material.

4. The face mask of claim 3, wherein the filter material comprises a melt-blown or spun bonded polypropylene material.

5. The face mask device of claim 1, comprising one or more tabs on the frame, the one or more tabs being configured for attachment to one of the one or more straps.

6. The face mask device of claim 5, wherein the one or more tabs is at least two tabs, arranged in pairs on opposing lateral sides of the face mask, and each of the one or more straps is configured to pass around a user's head for connection to one of the at least two tabs on a first lateral side of the frame and to another of the at least two tabs on a second lateral side of the frame, the first lateral side of the frame being opposite that of the second lateral side, to secure the face mask device to the user's face.

7. The face mask device of claim 5, wherein the one or more tabs is at least two tabs, arranged in pairs on opposing lateral sides of the face mask, and each of the one or more straps is configured to pass around an ear of the user for connection between the at least two tabs on a same lateral side of the frame to secure the face mask device to the user's face.

8. The face mask device of claim 1, wherein the frame comprises an upper portion, configured to be positioned around the user's nose and over a bridge of the user's nose, and a lower portion, which is attached to the upper portion and is configured to form a perimeter around the user's mouth, wherein the lower portion is substantially circular, oval shaped, and/or oblong.

9. The face mask device of claim 8, wherein the upper portion and/or the lower portion comprise indentions and contours configured to have a substantially similar shape as a shape of the user's face.

10. The face mask device of claim 8, wherein the lower portion comprises a protruding portion that extends at an angle away from a direction of extension of a remainder of the lower portion, the protruding portion being configured to be positioned under the user's chin to secure the frame under the user's chin.

11. The face mask device of claim 10, wherein the frame comprises a rigid material, a semi-rigid material, a flexible material, a thermoforming material, and/or an elastic material.

12. The face mask device of claim 8, comprising a nose bridge attachment that is fixed or adjustable over a nose bridge of the user's face, wherein the nose bridge attachment is integrated into, or formed in a single piece with, the upper portion of the frame.

13. The face mask device of claim 8, comprising, extending from the upper portion and/or the lower portion of the frame, protrusions configured to press the filter material against the user's face to accommodate varying facial geometry of the user, or wherein the upper portion and/or the lower portion are configured to have an adjustable size to fit any of a plurality of facial sizes and/or geometries.

14. The face mask device of claim 1, wherein the frame is configured to attach the filter material to the frame.

15. The face mask device of claim 1, comprising a cover that at least partially covers the frame.

16. The face mask of claim 15, wherein the cover comprises a hydrogel or silicone material, or wherein the cover is a conformal coating.

17. The face mask device of claim 1, wherein the frame comprises one or more clips configured to accept, hold, secure, and/or position an eye/face shield/splash guard over the user's face.

18. The face mask device of claim 17, wherein the clip is configured to accept, hold, secure, and/or position googles and/or eyewear over a user's face.

19. The face mask device of claim 1, wherein the frame is configured to fit and/or secure a face mask thereto.

20. The face mask device of claim 1, wherein the frame is configured for folding to reduce a size thereof when not being worn by the user.

21. The face mask device of claim 1, wherein at least a portion of the frame comprises anisotropic mechanical properties.

22. The face mask device of claim 1, wherein the filter material is selected from surgical masks, surgical masks with eye shields pre-attached, earloop masks, duckbill masks, cloth material, bandana material, fabric material, filtration material, N95, N99, N100, P95, P99, P100, KN95, FFP3,2,1, and/or custom or non-standard masks.

23. The face mask device of claim 1, wherein at least a portion of the frame is made from a thermoforming plastic that can be shaped to form a custom fit against a surface of an individual user's head.

24. A face mask system comprising a face mask device of claim 1 and one or more filter materials, wherein at least one filter material comprises an inner cover and an outer cover that are attached to each other to form a pocket and wherein the face mask device is configured for insertion within the pocket to secure the filter material over and about the user's mouth and nose.

25. The face mask system of claim 24, wherein the one or more straps are integrally formed with the frame of the face mask device.

26. A face mask device comprising:
a frame configured to be worn on a user's face, wherein the frame comprises an upper portion, configured to be positioned around the user's nose and over a bridge of the user's nose, a lower portion, which is attached to the upper portion and is configured to form a perimeter around the user's mouth, and a protruding portion, wherein the lower portion is substantially circular, oval shaped, and/or oblong, wherein the upper portion comprises metal material, the lower portion comprises a plastic material, and the protruding portion comprises an elastic material; and
one or more straps configured to be attached to the frame for applying a tension force to the frame to press the frame against a surface of the user's face over which the frame is positioned;
wherein the frame is configured, due to the tension force exerted by the one or more straps, to flex and/or conform to the surface of the user's face with which the frame is in contact; and
wherein the frame is configured to secure a filter material against the surface of the user's face to prevent unfiltered air from being inhaled by the user without passing through the filter material.

* * * * *